(12) United States Patent
Kato et al.

(10) Patent No.: US 7,465,093 B2
(45) Date of Patent: Dec. 16, 2008

(54) LINEAR GUIDE APPARATUS

(75) Inventors: Soichiro Kato, Kanagawa (JP); Wei Xu, Kanagawa (JP)

(73) Assignee: NSK Ltd., Tokyo (JP)

( * ) Notice: Subject to any disclaimer, the term of this patent is extended or adjusted under 35 U.S.C. 154(b) by 723 days.

(21) Appl. No.: 10/797,109

(22) Filed: Mar. 11, 2004

(65) Prior Publication Data

US 2004/0213485 A1    Oct. 28, 2004

(30) Foreign Application Priority Data

| Mar. 13, 2003 | (JP) | ................... P. 2003-068595 |
| Oct. 30, 2003 | (JP) | ................... P. 2003-370977 |
| Dec. 8, 2003  | (JP) | ................... P. 2003-408976 |

(51) Int. Cl.
*F16C 29/08* (2006.01)

(52) U.S. Cl. .......................................... 384/44; 384/45

(58) Field of Classification Search ............. 384/43–45
See application file for complete search history.

(56) References Cited

U.S. PATENT DOCUMENTS 3,219,398 A * 11/1965 Anderson .................... 384/44
3,937,532 A * 2/1976 Fuhrmann et al. ............. 384/44
3,964,802 A * 6/1976 Pitner ........................ 384/44

FOREIGN PATENT DOCUMENTS

| JP | 11-002241 | * | 1/1999 |
| JP | 2002-54633 A | | 2/2002 |
| JP | 2003-269463 A | | 9/2003 |
| JP | 2003-278752 A | | 10/2003 |

* cited by examiner

*Primary Examiner*—William C Joyce
(74) *Attorney, Agent, or Firm*—Sughrue Mion, PLLC

(57) ABSTRACT

A linear guide apparatus has: a guide rail; a slider including a slider body; and a pair of end caps; a guide groove guiding the arm portions of the separators in a circulation direction of the cylindrical rollers when the cylindrical rollers circulate through the pair of the rolling element rolling grooves, the direction change paths, and the rolling element path; and separators each having: a separator body; and an arm portion integrally formed on the separator body, wherein a width of the guide groove is larger than that of the arm portions, the width of the guide groove in a region of each of the direction change paths is larger than that in a region where the cylindrical rollers linearly move, and end portions of each of the arm portions are Chamfered and directed in the circulation direction.

5 Claims, 28 Drawing Sheets

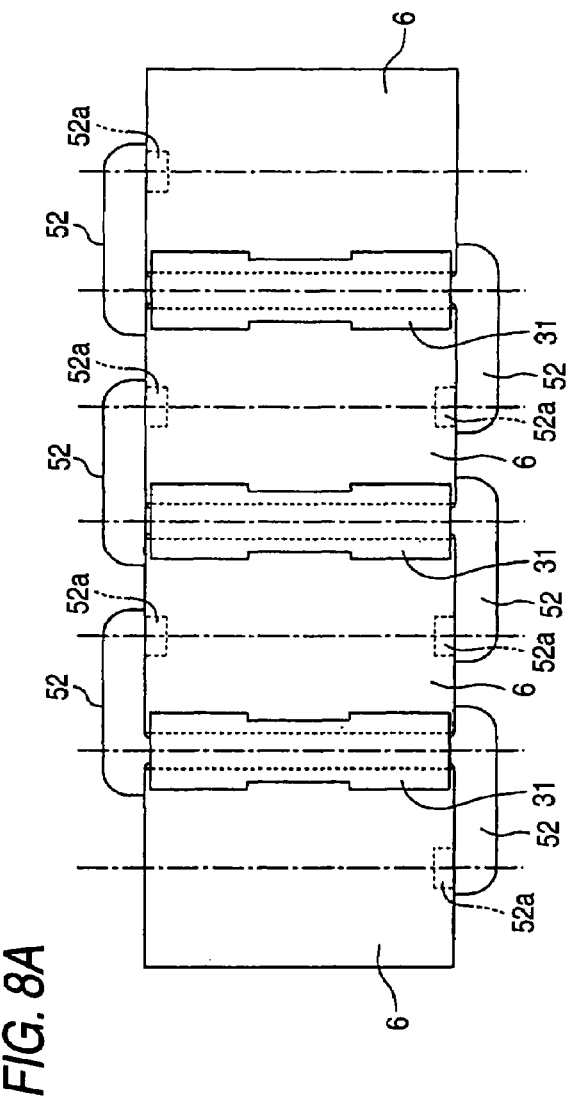
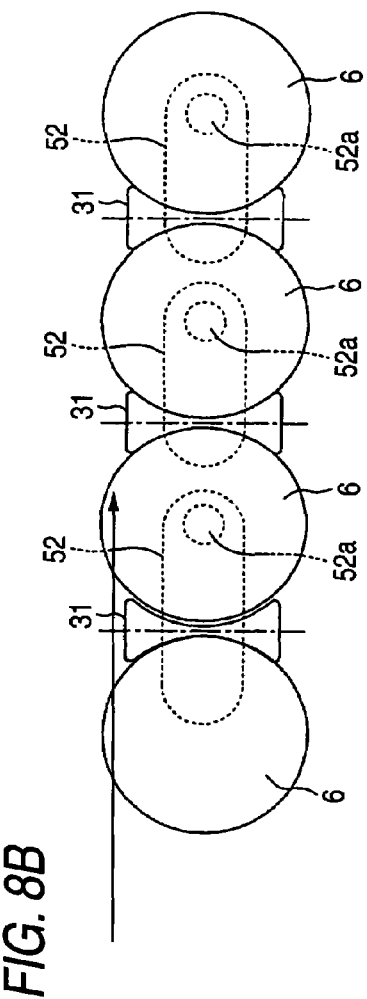
FIG. 8A
FIG. 8B

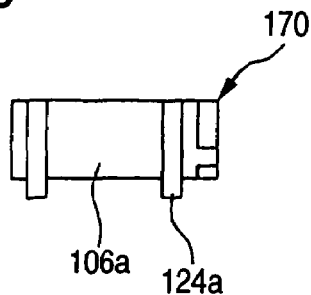
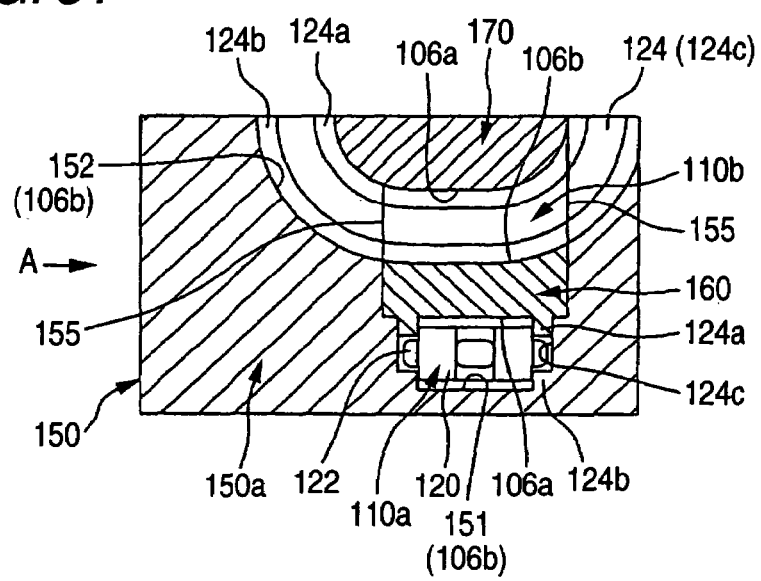
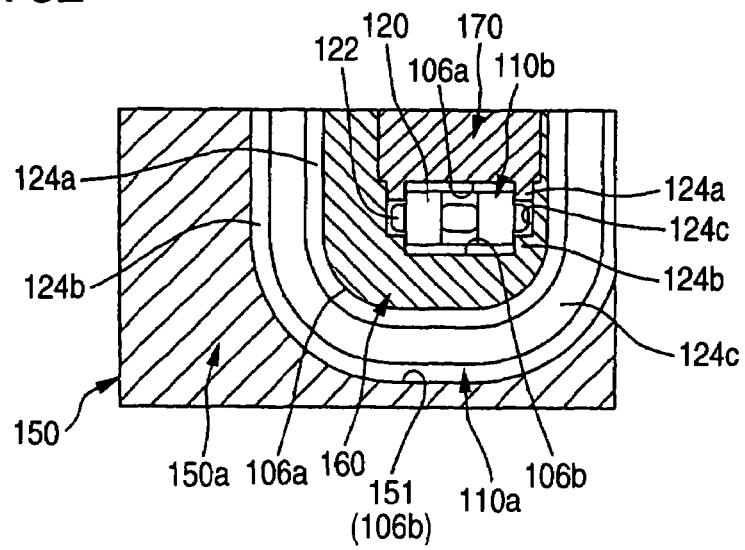

LINEAR GUIDE APPARATUS

BACKGROUND OF THE INVENTION

1. Field of the Invention

The present invention relates to a linear guide apparatus which can be used in the industrial machinery field, etc.

The present invention also relates to a linear guide apparatus which can be used in, for example, the industrial machinery field such as a machine tool or an injection molding machine.

Further, the present invention relates to a linear guide apparatus which can be used in, for example, the industrial machinery field such as a machine tool or an injection molding machine.

2. Description of the Related Art

FIG. 13 shows an example of a conventional linear guide apparatus of this kind.

The linear guide apparatus has a guide rail 1 which extends in the axial direction, and a slider 2 which straddles the guide rail 1 so as to be relatively movable in the axial direction.

In each of the side faces in the width direction of the guide rail 1, two rolling element rolling grooves 3 which elongate in the axial direction are formed. Namely, four rolling element rolling grooves are formed in total. In the slider body 2A of the slider 2, rolling element rolling grooves 5 respectively opposed to the rolling element rolling grooves 3 are formed in the inner side faces of wing portions 4.

A large number of cylindrical rollers 6 serving as rolling elements are rotatably charged between the opposed rolling element rolling grooves 3, 5. By means of rolling of the cylindrical rollers 6, the slider 2 is caused to be relatively movable on the guide rail 1 in the axial direction.

In accordance with the movement, the cylindrical rollers 6 which are interposed between the guide rail 1 and the slider 2 are rotated and moved toward an axial end portion of the slider 2. In order to enable the slider 2 to be continuously moved in the axial direction, it is necessary to endlessly circulate the cylindrical rollers 6.

Therefore, holes 7 which axially pass through the wing portions 4 of the slider body 2A are formed, and a circulation tube 8 the inner side of which is to be used as a path (rolling element path) 8a for the cylindrical rollers 6 is fitted into each of the holes 7. A pair of end caps 9 which are parts for circulating rolling elements are fixed respectively to axial ends of the slider body 2A by screws or the like. In each of the end caps 9, a direction change path 10 (see FIG. 1) which is curved in a semicircular arc-like shape so as to communicate the pair of opposed rolling element rolling grooves 3, 5 with the rolling element path 8a is formed, thereby forming an endless circulation raceway for the cylindrical rollers 6.

The large number of cylindrical rollers 6 which are endlessly circulated are rotated in the same direction about the respective roller axes. When adjacent ones of the cylindrical rollers 6 are in contact with each other, therefore, the directions of the roller velocities in the contact area are opposite to each other, and a force due to the opposite directions impedes smooth rotations of the cylindrical rollers 6.

Since the cylindrical rollers 6 are used as rolling elements, the rigidity and the load capacity are enhanced as compared with the case where balls are used. On the other hand, runout of the cylindrical rollers 6 during running of the slider, or so-called skew occurs to cause the operation ability to be lowered.

Under these circumstances, conventionally, a separator 20 is interposed between adjacent ones of the cylindrical rollers 6 so as to prevent the rolling rollers from being in direct contact with each other, and suppress the skew. According to the configuration, the slider 2 can smoothly run, and the noise level during running can be lowered.

Each of the separators 20 has: a separator body 21 which is to be interposed between adjacent cylindrical rollers 6; and arm portions 22 which are placed so as to sandwich the axial end faces of the cylindrical rollers 6, and which are integrated with the separator body 21. In the separator body 21, concavely curved faces corresponding to the outer circumferential shape of the cylindrical rollers 6 are formed in portions respectively opposed to the outer peripheral faces of the cylindrical rollers 6. In FIG. 13, 23 denotes separator guide members which are placed between the outer side faces of the guide rail 1 and the inner side faces of the slider 2.

When the cylindrical rollers 6 are circulated through the pair of rolling element rolling grooves 3, 5, the direction change paths 10, and the rolling element path 8a, the arm portions 22 of the separators 20 are guided along the circulation direction of the cylindrical rollers 6 by the separator guide members 23, and guide grooves 24 which are formed in the rolling element path 8a and the direction change paths 10.

In the conventional linear guide apparatus, each of the guide grooves 24 has an identical width in all of regions where the cylindrical rollers 6 are linearly moved, and those of the direction change paths 10. When the guide groove 24 is set so as to have a width which is ideally suitable in the linear motion regions, therefore, the arm portions 22 of the separators 20 interfere with the guide groove 24 in the direction change regions.

To comply with this, conventionally, the width of the guide groove 24 is set to a value which enables the arm portions 22 to be moved without interfering with the guide groove 24 in the direction change regions. The width is set as that of the guide groove in all the linear motion regions and the direction change regions.

In this configuration, however, the width of the guide groove 24 in the linear motion regions is larger than that in the ideal state, and hence the gaps between the arm portions 22 of the separators 20 and the guide groove are excessively large in the linear motion regions.

In each of the endless circulation raceways, each separator 20 and the corresponding cylindrical roller 6 are moved with being pushed by the rear cylindrical roller 6. In the case where the gaps between the arm portions.22 of the separators 20 and the guide groove are excessively large in the linear motion regions, therefore, the separators 20 may produce a zigzag motion to largely change the axis-to-axis distance of adjacent ones of the cylindrical rollers 6. As a result, the operation ability may be impaired.

In the conventional linear guide apparatus, each of the guide grooves 24 has an identical width in all of regions where the cylindrical rollers 6 are linearly moved, and those of the direction change paths 10. In the linear motion regions, therefore, each cylindrical roller 6 is in close contact with the concavely curved face of the separator body 21 of the corresponding separator 20, and the arm portion 22 is smoothly guided along the guide groove 24.

When the separator 20 enters the R-arcuated direction change region to be inclined as shown in FIG. 18, however, the arm portion 22 of the separator interferes with the inner peripheral wall of the guide groove 24 (see FIG. 19), thereby disabling the cylindrical roller 6 to be circulated in a state where it is in close contact with the concavely curved face of the separator body 21. As a result, problems such as that the intervals of the cylindrical rollers 6 fluctuate to cause vibrations to be easily produced, and that the life period of the separator 20 is shortened may arise.

FIG. 48 shows an example of a conventional linear guide apparatus of this kind.

The linear guide apparatus has a guide rail 101 which extends in the axial direction, and a slider 102 which straddles the guide rail 101 so as to be relatively movable in the axial direction.

In the guide rail 101, two or upper and lower rolling element rolling grooves 103 which elongates in the axial direction are formed on each of side faces in the width direction, or namely four rolling element rolling grooves are formed in total. In the slider body 102A of the slider 102, two or upper and lower rolling element rolling grooves 105 respectively opposed to the rolling element rolling grooves 103 are formed on the inner side face of each of wing portions 104, or namely four rolling element rolling grooves are formed in total.

A large number of cylindrical rollers 106 serving as rolling elements are rotatably charged between the opposed rolling element rolling grooves 103, 105. By means of rolling of the cylindrical rollers 106, the slider 102 is caused to be relatively movable on the guide rail 101 in the axial direction.

In accordance with the movement, the cylindrical rollers 106 which are interposed between the guide rail 101 and the slider 102 are rotated and moved toward an axial end portion of the slider 102. In order to enable the slider 102 to be continuously moved in the axial direction, it is necessary to endlessly circulate the cylindrical rollers 106.

Therefore, two or upper and lower holes 107 which axially pass through each of the wing portions 104 of the slider body 102A are formed in the wing portion 104, or four holes are formed in total. A circulation sleeve 108 the inner side of which is to be used as a path (rolling element path) 108a for the cylindrical rollers 106 is fitted to each of the holes 107. A pair of end caps 109 which are parts for circulating rolling elements are fixed respectively to axial ends of the slider body 102A by screws or the like. In each of the end caps 109, a direction change path 110 (see FIG. 49) which is curved in an arc-like shape so as to communicate the pair of opposed rolling element rolling grooves 103, 105 with the rolling element path 108a is formed, thereby forming an endless circulation raceway for the cylindrical rollers 106.

As shown in FIG. 49, each of the end caps 109 has: an end cap body 109a; and a first return guide 130 and a second return guide 140 which are fitted in the axial direction to the side of the end cap 109 which faces the corresponding end face of the slider body 102A.

The first return guide 130 and the second return guide 140 are formed as plate-like members having a substantially same outer shape. Plural projections, recesses, and holes for forming the direction change paths 110 are disposed in parallel joining faces which are opposed to each other and outer side faces. The joining faces of the first return guide 130 and the second return guide 140 are joined together so that projections and recesses are fitted and their outer shapes substantially coincide with each other. Under this state, the first return guide 130 is axially fitted to the end cap body 109a (for example, see JP-A-2002-54633).

In this example, the first return guide 130, the second return guide 140, and the end cap body 109a form a direction change path 110 through which the upper rolling element path 108a communicates with the lower pair of rolling element rolling grooves 103, 105, and the first return guide 130 and the second return guide 140 form a direction change path 110 through which the lower rolling element path 108a communicates with the upper pair of rolling element rolling grooves 103, 105.

The large number of cylindrical rollers 106 which are endlessly circulated are rotated in the same direction about the respective roller axes. When adjacent ones of the cylindrical rollers 106 are in contact with each other, therefore, the directions of the roller velocities in the contact area are opposite to each other, and a force due to the opposite directions impedes smooth rotations of the cylindrical rollers 106.

Since the cylindrical rollers 106 are used as rolling elements, the rigidity and the load capacity are enhanced as compared with the case where balls are used. On the other hand, runout of the cylindrical rollers 106 during running of the slider, or so-called skew occurs to cause the operation ability to be lowered.

Under these circumstances, conventionally, a separator 120 is interposed between adjacent ones of the cylindrical rollers 106 so as to prevent the rolling rollers from being in direct contact with each other, and suppress the skew. According to the configuration, the slider 102 can smoothly run, and the noise level during running can be lowered.

As shown in FIGS. 50 to 52, each of the separators 120 has: a separator body 121 which is to be interposed between adjacent cylindrical rollers 106; and arm portions 122 which are placed so as to sandwich the axial end faces of the cylindrical rollers 106, and which are integrated with the separator body 121. In the separator body 121, concavely curved faces 121a corresponding to the outer circumferential shape of the cylindrical rollers 106 are formed in portions respectively opposed to the outer peripheral faces of the cylindrical rollers 106. In FIG. 48, 23 denotes separator guide members which are placed between the outer side faces of the guide rail 101 and the inner side faces of the slider 102.

When the cylindrical rollers 106 are circulated through the pair of rolling element rolling grooves 103, 105, the direction change paths 110, and the rolling element path 108a, the arm portions 122 of the separators 120 are guided along the circulation direction of the cylindrical rollers 106 by the separator guide members 123, and guide grooves 124 which are formed in the rolling element path 108a and the direction change paths 110.

In the conventional linear guide apparatus, both the first return guide 130 and the second return guide 140 are formed as plate-like members having a complex and substantially same outer shape, and the plural projections, recesses, and holes for forming the direction change paths 110 are disposed in the parallel joining faces which are opposed to each other and the outer side faces. Therefore, the shapes of the guides are complicated and require a high molding accuracy. Moreover, the work of fitting the projections and recesses of the joining faces of the first return guide 130 and the second return guide 140 so that their outer shapes substantially coincide with each other is cumbersome. As a result, the efficiency of the assembly work is poor, and the production cost is high.

The end cap body 109a, the first return guide 130, and the second return guide 140 have a structure in which these components are split from one another in a substantially parallel manner. Therefore, there are many split planes which cross the roller raceway groove of the direction change path 110 in the roller axis direction (two split planes between the first return guide 130 and the second return guide 140, and one split plane between the first return guide 130 and the end cap body 109a, or three split planes in total). As a result, the number of steps in joining portions in the split planes is increased, thereby causing the possibility that the guiding accuracy of the cylindrical rollers 106 is impaired and the operation ability is adversely affected.

SUMMARY OF THE INVENTION

The invention has been conducted in order to solve the problems. It is an object of the invention to provide a linear guide apparatus in which, without causing an arm portion of a separator to interfere with a guide groove, an optimum width of a guide groove can be set in all of a linear motion region and direction change regions, so that satisfactory operation ability can be ensured.

According to a first aspect of the present invention, in order to attain the object, there is provided that a linear guide apparatus having: a guide rail including an axially elongating rolling element rolling groove in each of sides thereof, and extended in an axial direction; a slider including rolling element rolling grooves respectively opposed to the rolling element rolling grooves of the guide rail, and straddling the guide rail to be relatively movable in the axial direction via a number of cylindrical rollers, the rollers serving as rolling elements interposed between the opposed rolling element rolling grooves, the slider having: a slider body having a rolling element path passing through the body in the axial direction; and a pair of end caps respectively having curved direction change paths through which a pair of the rolling element rolling grooves communicates with the rolling element path, the end caps being respectively fixed to axial end faces of the slider body; a guide groove guiding the arm portions of the separators in a circulation direction of the cylindrical rollers when the cylindrical rollers circulate through the pair of the rolling element rolling grooves, the direction change paths, and the rolling element path; and separators each having: a separator body interposed between adjacent the cylindrical rollers; and an arm portion integrally formed on the separator body and facing at least one of axial end faces of the cylindrical rollers, wherein a width of the guide groove is larger than a width of each of the arm portions, the width of the guide groove in a region of each of the direction change paths is larger than the width of the guide groove in a region where the cylindrical rollers linearly move, and end portions of each of the arm portions are Chamfered, the end portions being directed in the circulation direction of the cylindrical rollers.

According to a second aspect of the present invention, there is provided that a linear guide apparatus according to the first aspect, wherein, at a position where the linear motion region is connected to one of the direction change regions, a shape of an inner wall face of an inner side of the guide groove in the direction change path starts to be changed.

According to a third aspect of the present invention, there is provided that a linear guide apparatus according to the first or second aspect, wherein the width of the guide groove is made larger at a position being on a side of the linear motion region with respect to a position where the linear motion region is connected to one of the direction change regions.

According to a fourth aspect of the present invention, there is provided that a linear guide apparatus according to any one of the first to third aspects, wherein the arm portions is formed a band-like shape along the circulation direction of the cylindrical rollers.

According to a fifth aspect of the present invention, there is provided that a linear guide apparatus according to any one of the first to third aspects, wherein the arm portion is couplable to the axial end faces of the cylindrical roller.

The invention has been conducted in order to solve such problems. It is an object of the invention to provide a linear guide apparatus in which an arm portion of a separator in a direction change region is prevented from interfering with an inner peripheral wall of a guide groove, so that a roller can rotate in a state where the roller is in close contact with a separator body to prevent the intervals of the rollers from fluctuating, whereby vibrations are suppressed to ensure a stable operation, and the life period of the separator can be prolonged.

According to a sixth aspect of the present invention, there is provided that a linear guide apparatus having: a guide rail including an axially elongating rolling element rolling groove in each of sides thereof, and extended in an axial direction; a slider including rolling element rolling grooves respectively opposed to the rolling element rolling grooves of the guide rail, and straddling the guide rail to be relatively movable in the axial direction via a number of cylindrical rollers, the rollers serving as rolling elements interposed between the opposed rolling element rolling grooves, the slider having: a slider body having a rolling element path passing through the body in the axial direction; and a pair of end caps respectively having curved direction change paths through which a pair of the rolling element rolling grooves communicates with the rolling element path, the end caps being respectively fixed to axial end faces of the slider body; a guide groove guiding the arm portions of the separators in a circulation direction of the cylindrical rollers when the cylindrical rollers circulate through the pair of the rolling element rolling grooves, the direction change paths, and the rolling element path; and separators each having: a separator body interposed between adjacent the cylindrical rollers; and an arm portion integrally formed on the separator body and facing at least one of axial end faces of the cylindrical rollers, wherein an escape portion is disposed in an R-arcuate inner peripheral wall of the guide groove in each of the direction change paths, the escape portion escaping toward an inner side of the direction change path.

According to a seventh aspect of the present invention, there is provided that a linear guide apparatus according to the sixth aspect, wherein the escape portion has a single R-arcuate shape which is larger in radius of curvature than the R-arcuate shape of the inner peripheral wall of the guide groove in the direction change path without the escape portion.

According to a eighth aspect of the present invention, there is provided that a linear guide apparatus according to the sixth or seventh aspect, wherein a center of curvature of the escape portion is positioned on an extended line of a line passing a center of curvature of the R-arcuate shape of the inner peripheral wall of the guide groove and substantially equally dividing the R-arcuate shape, whereby the escape portion is formed into an R-arcuate shape of 90 degree consisting of subportions of 45 degree being respectively on both sides of the extended line.

According to a ninth aspect of the present invention, there is provided that a linear guide apparatus according to any one of the sixth to eighth aspects, wherein the escape portion is connected by an arc and/or a straight line to the inner peripheral wall of the guide groove disposed on both sides of the escape portion in a circumferential direction.

According to the invention, an escape portion which escapes toward the inner side of the direction change path is disposed in the R-arcuate inner peripheral wall of the guide groove in each of the direction change paths, and hence the arm portion of the separator in the direction change region is prevented from interfering with the inner peripheral wall of the guide groove, so that the roller can rotate in a state where the roller is in close contact with the separator body.

As a result, the intervals of the rollers can be prevented from fluctuating in the direction change region, whereby vibrations are suppressed to ensure a stable operation, and the life period of the separator can be prolonged.

The invention has been conducted in order to solve such problems. It is an object of the invention to provide a linear guide apparatus in which a work of fitting the first and second return guides can be simplified, so that the assembly work can be efficiently conducted, and hence the production cost can be reduced, and the number of steps in a roller raceway groove in a direction change path can be reduced, so that the operation ability can be improved.

According to a tenth aspect of the present invention, there is provided that a linear guide apparatus having: a guide rail including an axially elongating rolling element rolling groove in each of sides thereof; and a slider including rolling element rolling grooves respectively opposed to the rolling element rolling grooves of the guide rail, and straddling the guide rail via a number of rollers to be relatively movable in the axial direction, the rollers serving as rolling elements interposed between the opposed rolling element rolling grooves, the slider further including: a slider body having rolling element paths passed through the body in the axial direction; and a pair of end caps each having curved direction change paths through, spaces between the rolling element rolling grooves communicating with the rolling element paths, the end caps being respectively fixed to axial end faces of the slider body, the rolling element rolling grooves being disposed as upper and lower rolling element rolling groove pairs on each of the sides to be four pairs in total, the rolling element paths being disposed as upper and lower rolling element paths on each of the sides to be four paths in total, wherein each of the end caps having: an end cap body; a first return guide fitted to a side of the end cap body in the axial direction, the side facing corresponding one of the end faces of the slider body; and a second return guide fitted to the first return guide in the axial direction, the first return guide and the second return guide are substantially perpendicularly arranged to form a generally rectangular shape in which a raceway groove for the rollers is disposed on a short side as seen in the axial direction, the first return guide and the end cap body form one of: a direction change path through which the upper rolling element path communicates with the lower pair of rolling element rolling grooves; and a direction change path through which the lower rolling element path communicates with the upper pair of rolling element rolling grooves, and the second return guide, the end cap body, and the first return guide form another one of the direction change paths.

According to a eleventh aspect of the present invention, there is provided that a linear guide apparatus according to the tenth aspect, wherein a roller raceway groove on an inner peripheral side of the direction change path formed by the first return guide and the end cap body is disposed in the first return guide, a roller raceway groove on an outer peripheral side of the direction change path is disposed in the end cap body, a roller raceway groove on an inner peripheral side of the direction change path formed by the second return guide, the end cap body, and the first return guide is disposed in the second return guide, and a roller raceway groove on an outer peripheral side of the direction change path is disposed in the end cap body and the first return guide.

According to a twelfth aspect of the present invention, there is provided that a linear guide apparatus according to the tenth or eleventh aspect, wherein the linear guide apparatus further has separators each having: a separator body interposed between adjacent the rollers; and an arm portion facing at least one of axial end faces of the rollers, the arm portion being integrated with the separator body, a guide groove guides the arm portion of each of the separators along a circulation direction of the rollers is disposed, when the rollers circulate through the pair of rolling element rolling grooves, the direction change paths, and the rolling element path, and a support wall formed a part of the guide groove is disposed in the end cap body, the first return guide, and the second return guide.

According to a thirteenth aspect of the present invention, there is provided that a linear guide apparatus according to the twelfth aspect, wherein an inner peripheral support wall of the guide groove disposed in the direction change path formed by the first return guide and the end cap body is disposed in the first return guide, an outer peripheral support wall of the guide groove is disposed in the end cap body, an inner peripheral support wall of the guide groove disposed in the direction change path formed by the second return guide, the end cap body, and the first return guide is disposed in the second return guide, and an outer peripheral support wall of the guide groove is disposed in the end cap body and the first return guide.

According to a fourteenth aspect of the present invention, there is provided that a linear guide apparatus according to the thirteenth, wherein a bottom face of the guide groove disposed in the direction change path formed by the first return guide and the end cap body is disposed on a side of the end cap body, and a split plane between the first return guide and the end cap body is on an extended plane in a roller axis direction of the inner peripheral roller raceway groove on a side of the first return guide, or an extended plane in the roller axis direction of the inner peripheral support wall face of the guide groove on a side of the first return guide.

According to a fifteenth aspect of the present invention, there is provided that a linear guide apparatus according to the thirteenth aspect, wherein a bottom face of the guide groove disposed in the direction change path formed by the first return guide and the end cap body is disposed on a side of the first return guide, and a split plane between the first return guide and the end cap body is on an extended plane in a roller axis direction of the outer peripheral roller raceway groove on a side of the end cap body, or an extended plane in the roller axis direction of the outer peripheral support wall face of the guide groove on a side of the end cap body.

According to a sixteenth aspect of the present invention, there is provided that a linear guide apparatus according to fourteenth or fifteenth aspect, wherein the split plane between the end cap body and the first return guide is on a positioning face and/or an engaging face of the first return guide with respect to the end cap body.

According to a seventeenth aspect of the present invention, there is provided that a linear guide apparatus according to any one of the twelfth to sixteenth aspect, wherein a bottom face of the guide groove disposed in the direction change path formed by the second return guide, the end cap body, and the first return guide is disposed on a side of the end cap body and the first return guide, and a split plane between the second return guide and the first return guide is on an extended plane in the roller axis direction of the inner peripheral roller raceway groove on a side of the second return guide, or an extended plane in the roller axis direction of the inner peripheral support wall face of the guide groove on a side of the second return guide.

According to a eighteenth aspect of the present invention, there is provided that a linear guide apparatus according to any one of the twelfth to sixteenth aspects, wherein a bottom face of the guide groove disposed in the direction change path formed by the second return guide, the end cap body, and the first return guide is disposed on a side of the second return guide, and a split plane between the second return guide and the first return guide is on an extended plane in the roller axis direction of the outer peripheral roller raceway groove of the first return guide, or an extended plane in the roller axis direction of the outer peripheral support wall face of the guide groove of the first return guide.

According to a nineteenth aspect of the present invention, there is provided that a linear guide apparatus according to seventeenth or eighteenth aspect, wherein the split plane between the second return guide and the first return guide is on a positioning face and/or an engaging face of the second return guide with respect to the first return guide.

According to the invention, the first return guide and the second return guide are substantially perpendicularly arranged to form a generally rectangular shape in which a raceway groove for the rollers is disposed on the short side as seen in the axial direction of the slider body. Therefore, the shapes of the first return guide and the second return guide can be simplified so that requirement of a high molding accuracy can be avoided. Moreover, the work of fitting the first return guide and the second return guide in the axial direction can be easily conducted. As a result, the assembly work can be efficiently conducted, and hence the production cost can be reduced.

A roller raceway groove on the inner peripheral side of the direction change path formed by the first return guide and the end cap body is disposed in the first return guide, a roller raceway groove on the outer peripheral side of the direction change path is disposed in the end cap body, a roller raceway groove on the inner peripheral side of the direction change path formed by the second return guide, the end cap body, and the first return guide is disposed in the second return guide, and a roller raceway groove on the outer peripheral side of the direction change path is disposed in the end cap body and the first return guide. According to the configuration, only two split planes which cross in the roller axis direction are formed in the outer peripheral roller raceway groove of the direction change path that is formed by the second return guide, the end cap body, and the first return guide. Therefore, the number of steps in joining portions in the split planes is smaller than that in the conventional art. As a result, the guiding accuracy of the rollers can be improved, and the operation ability can be enhanced.

In the case where a separator body is interposed between adjacent ones of the rollers, with respect to also the guide groove which guides the arm portion of the separator in the direction change path along the circulation direction, the number of steps in joining portions in the split planes can be reduced in the same manner as the case of the roller raceway groove. Therefore, the guiding accuracy of the arm portion of the separator can be improved, and the operation ability can be enhanced.

BRIEF DESCRIPTION OF THE DRAWINGS

FIGS. 2A and 2B are diagrams which show a state where the separator is interposed between adjacent cylindrical rollers, and in which FIG. 2A shows a linear motion region, and FIG. 2B shows a direction change region;

FIGS. 7A and 7B are diagrams which illustrate a modification of the separator, and in which FIG. 7A shows a linear motion region, and FIG. 7B shows a direction change region;

FIGS. 8A and 8B are diagrams which illustrate another modification of the separator, and in which FIG. 8A is a view as seen from the side of the outer peripheral face of the cylindrical roller, and FIG. 8B is a view as seen in the axial direction of the cylindrical roller;

FIG. 30 is a bottom view of FIG. 28;

FIG. 31 is a section view showing a structure of fitting the end cap body, the first return guide, and the second return guide;

FIG. 32 is a section view showing the internal structure as seen in the direction of the arrow A in FIG. 31;

DETAILED DESCRIPTION OF THE PREFERRED EMBODIMENTS

Figure 1:
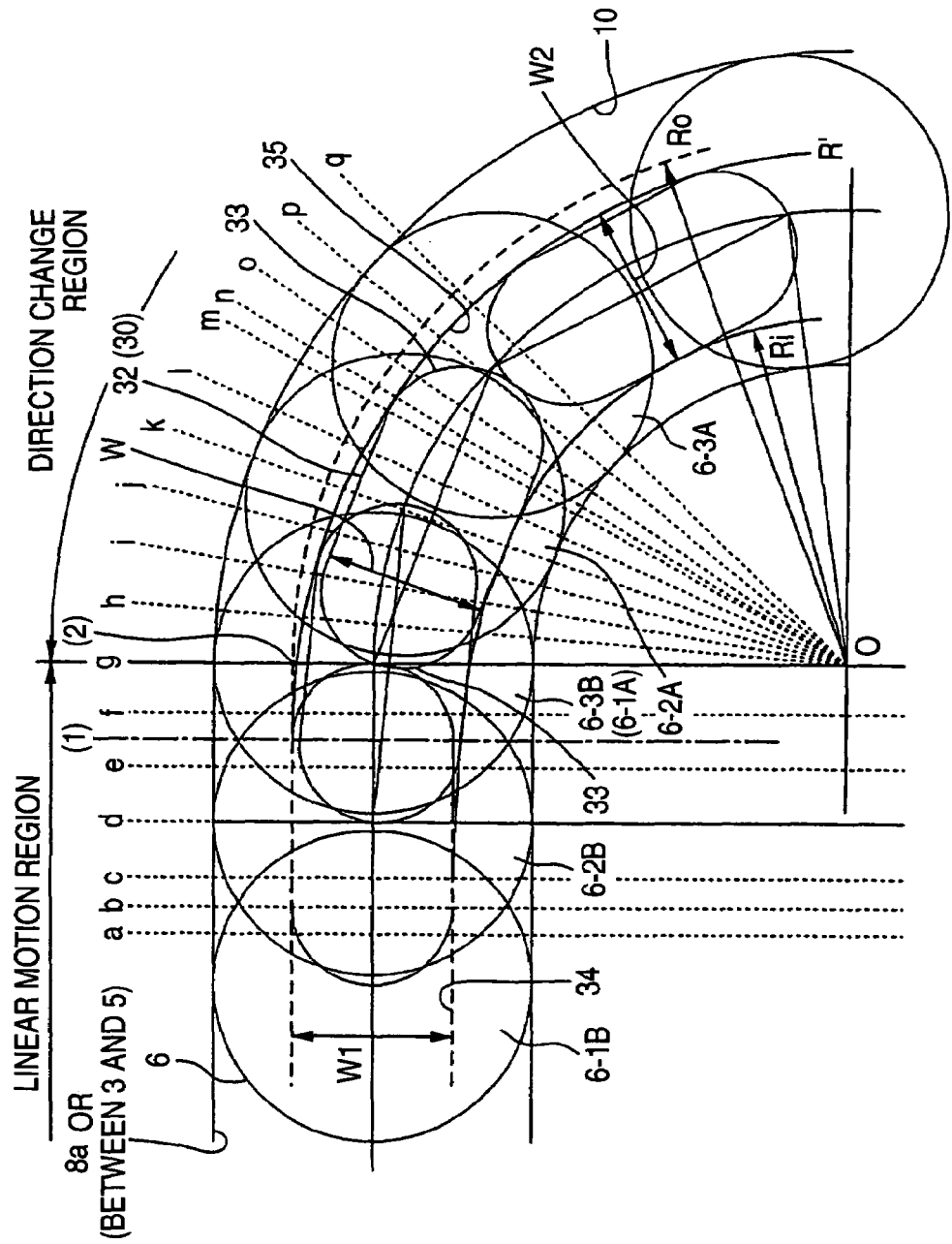
FIG. 1 is a diagram illustrating the movement locus of a separator in a roller raceway of a linear guide apparatus which is an embodiment of the invention.
Figure 2A:
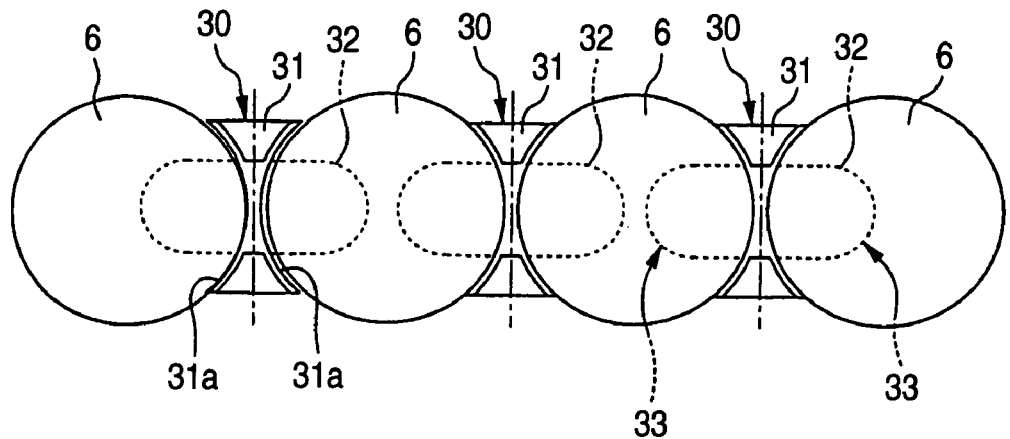
Figure 2B:
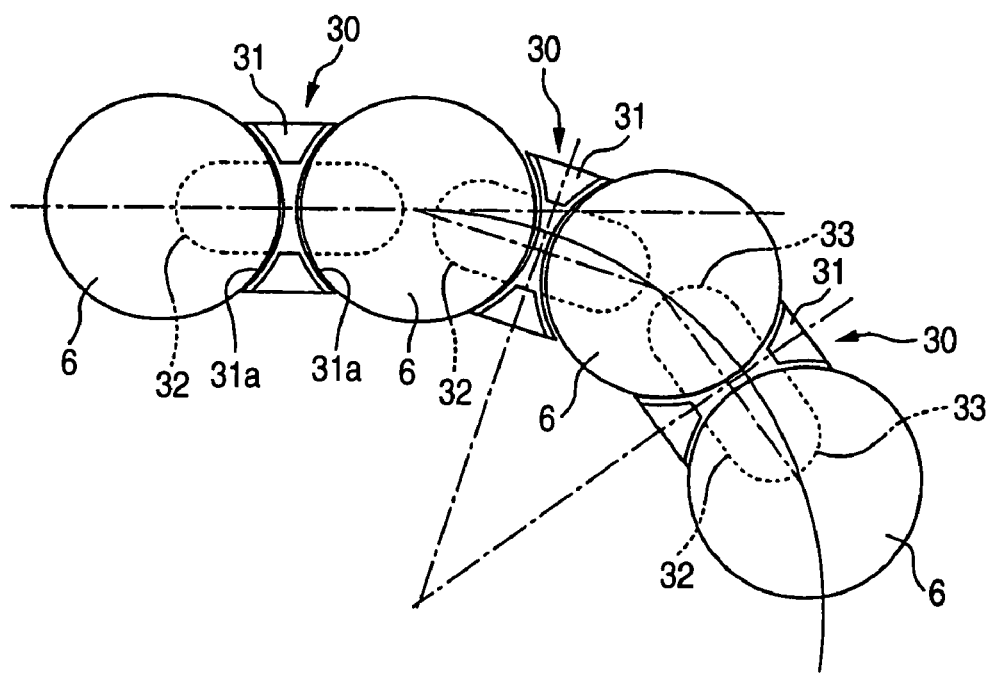
Figure 3:
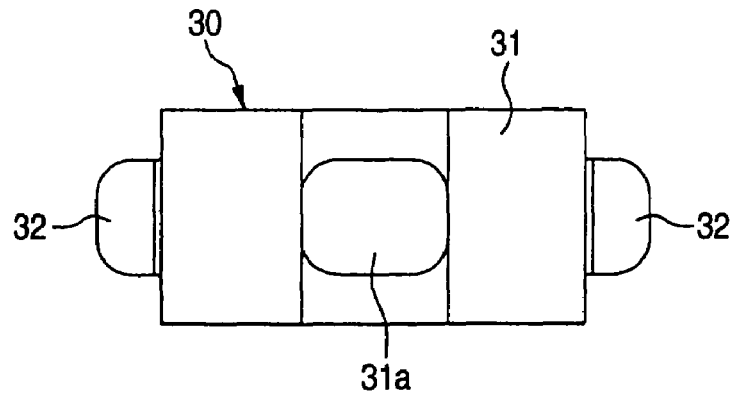
FIG. 3 is a view of the separator as seen from the circulation direction of the cylindrical rollers.
Figure 4:
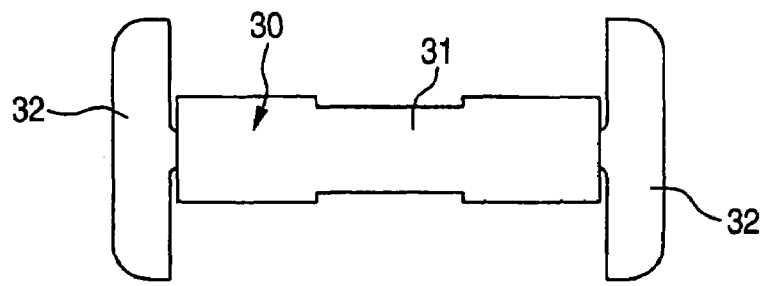
FIG. 4 is a plan view of FIG. 3.
Figure 5:
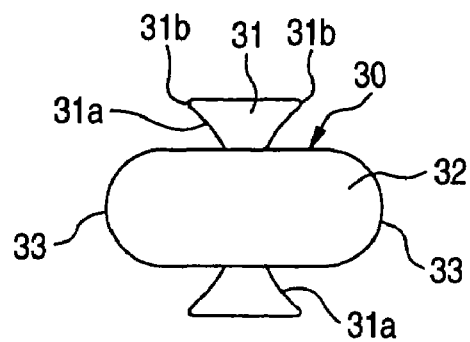
FIG. 5 is a side view of FIG. 4.
Figure 6:
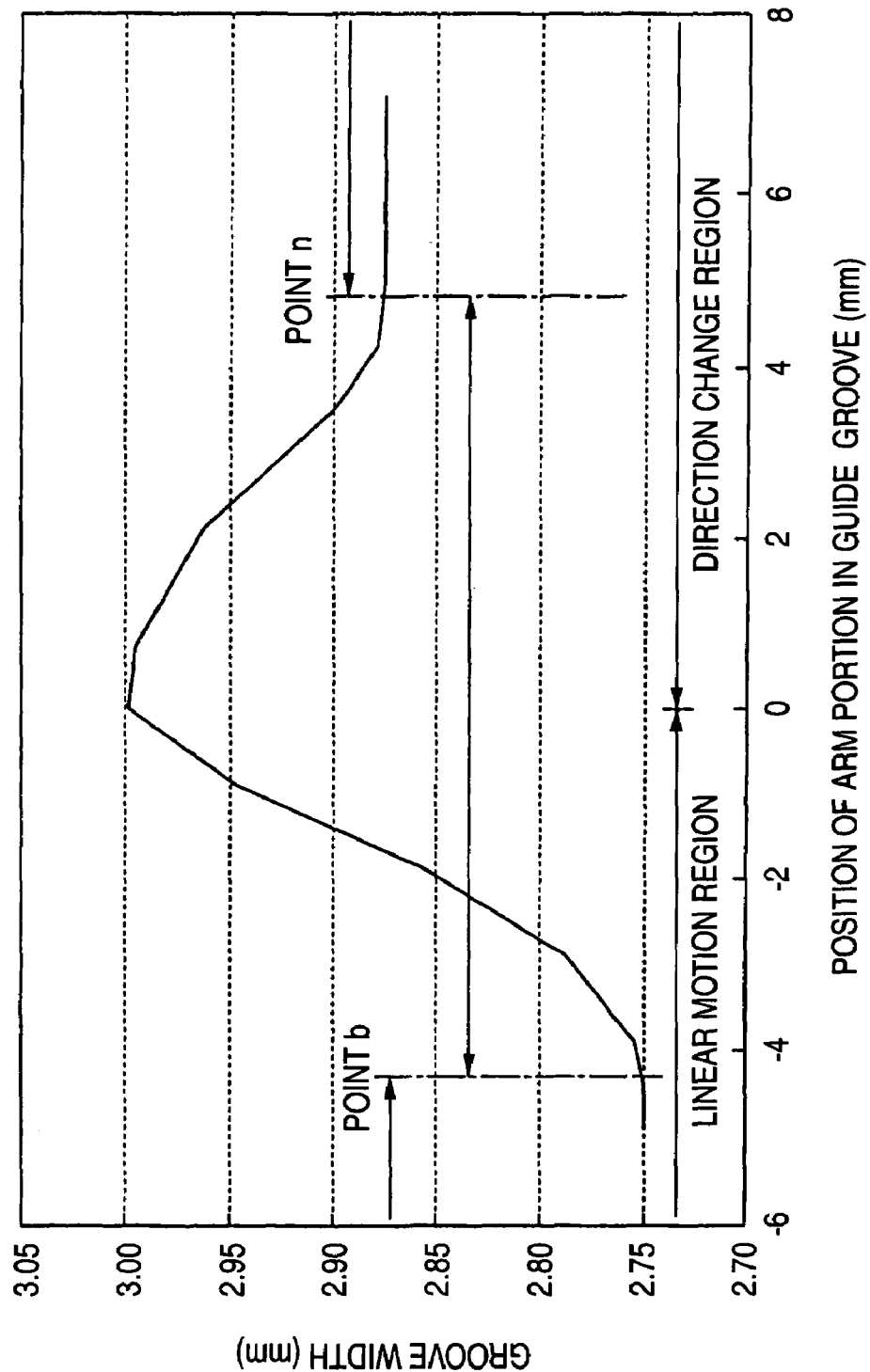
FIG. 6 is a graph showing changes of the width of a guide groove in the linear motion region and the direction change region.
Figure 9:
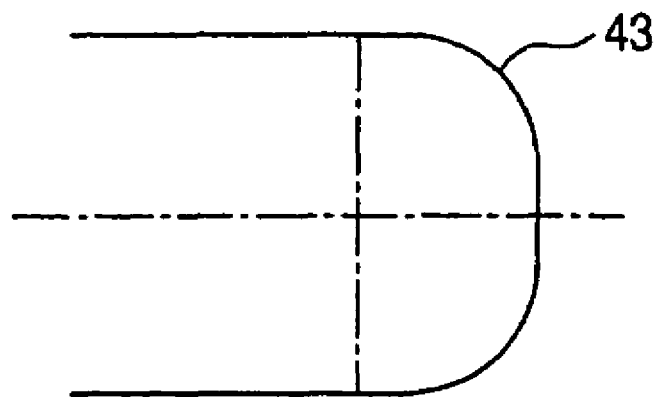
FIG. 9 is a diagram illustrating a modification of an R-chamfered shape of an end portion of an arm portion.
Figure 10:
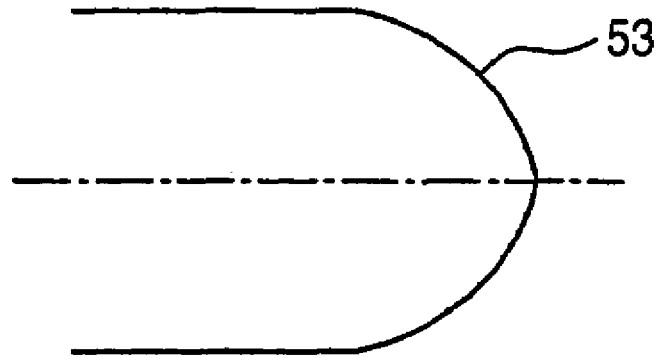
FIG. 10 is a diagram illustrating another modification of an R-chamfered shape of an end portion of an arm portion.
Figure 11A:
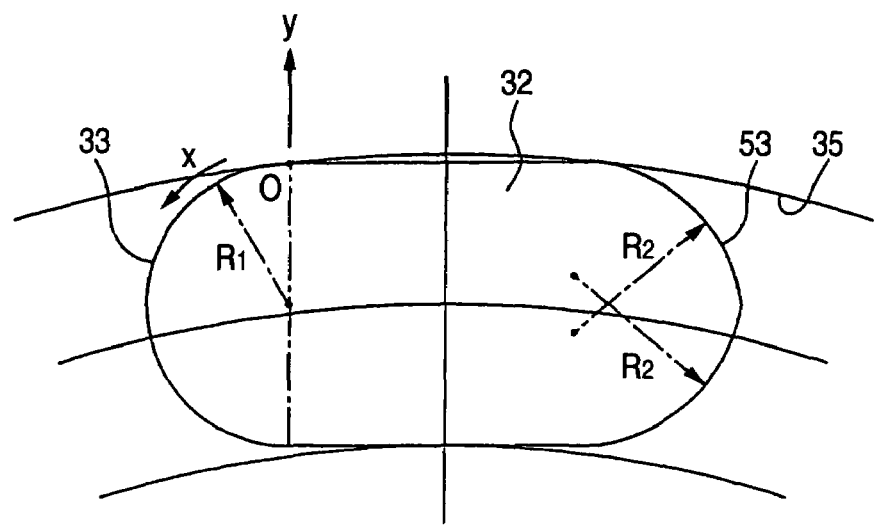
FIG. 11A is a diagram illustrating a comparison between a single-arc shape and a Gothic arch shape in an R-chamfered shape of an end portion of an arm portion.
Figure 12:
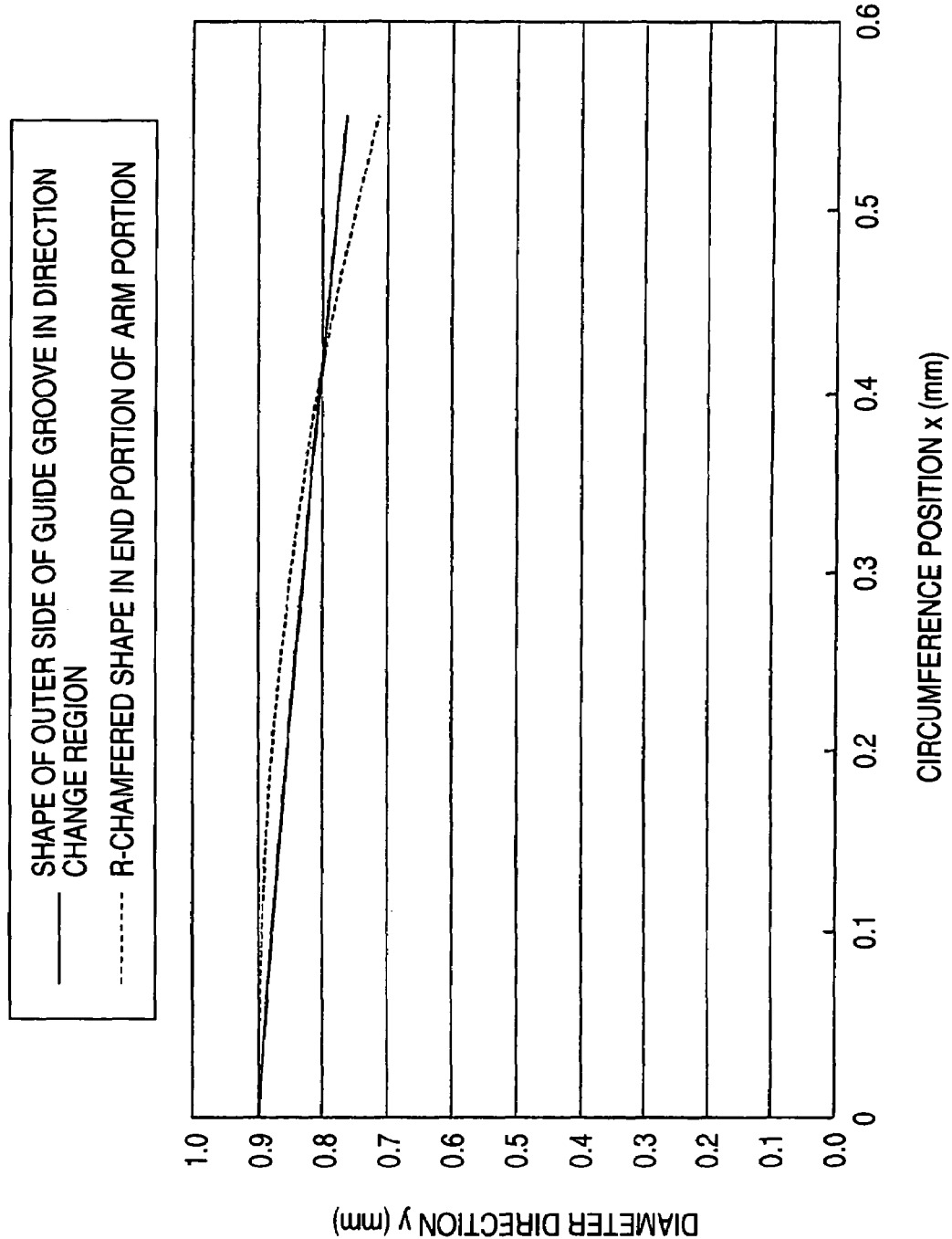
FIG. 12 is a graph showing a range of interference between an R-chamfered portion and a guide groove in the case where the R-chamfered shape of an end portion of an arm portion is the single-arc shape.
Figure 13:
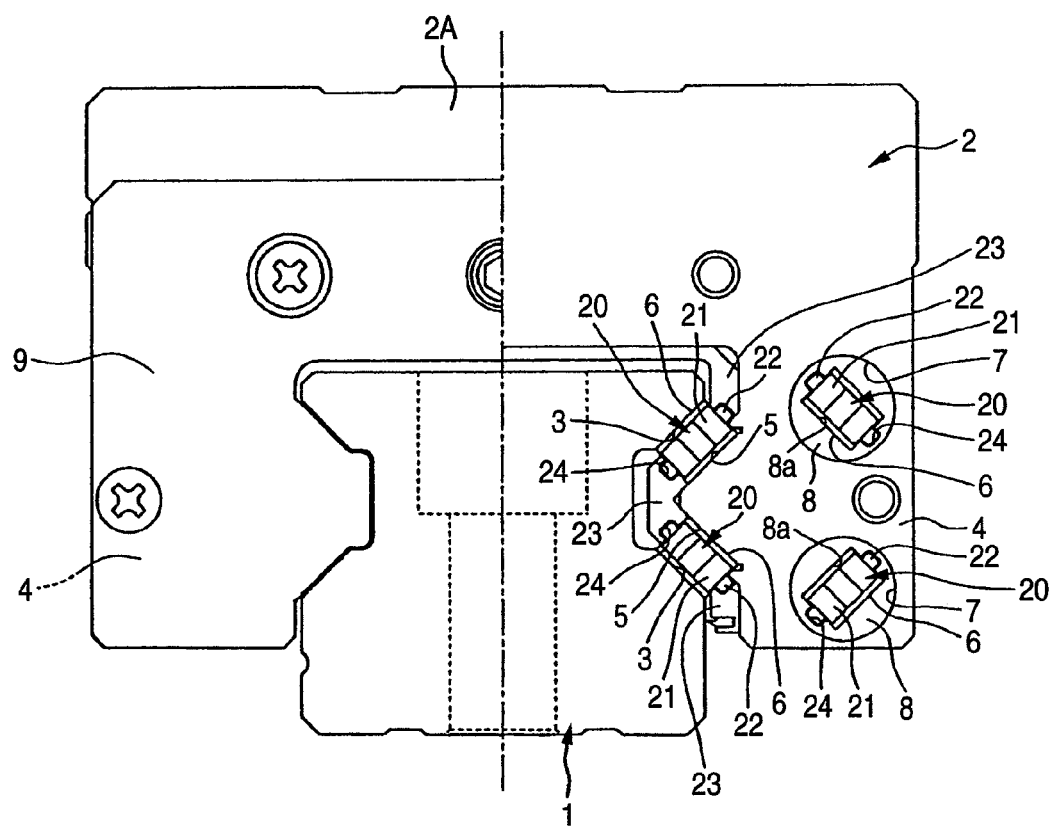
FIG. 13 is a partially cutaway view illustrating an example of a conventional linear guide apparatus.

Hereinafter, an embodiment of the invention will be described with reference to the figures. FIG. 1 is a diagram illustrating the movement locus of a separator in a roller raceway of a linear guide apparatus which is an embodiment of the invention, FIGS. 2A and 2B are diagrams showing a state where the separator is interposed between adjacent cylindrical rollers, FIG. 3 is a view of the separator as seen from the circulation direction of the cylindrical rollers, FIG. 4 is a plan view of FIG. 3, FIG. 5 is a side view of FIG. 4, FIG. 6 is a graph showing changes of the width of a guide groove in a linear motion region and a direction change region, FIGS. 7 and 8 are diagrams illustrating modifications of the separators FIGS. 9 and 10 are diagrams illustrating modifications of an R-chamfered shape of an end portion of an arm portion, FIG. 11A is a diagram illustrating a comparison between a single-arc shape and a Gothic arch shape in an R-chamfered shape of an end portion of an arm portion, and FIG. 12 is a graph showing an range of interference between an R-chamfered portion and a guide groove in the case where the R-chamfered shape of an end portion of an arm portion is the single-arc shape. In the following description of the embodiment, only points which are different from those of the conventional linear guide apparatus that has been described with reference to FIG. 13 will be described, and components identical with those of FIG. 13 are denoted by the same reference numerals.

Hereinafter, an embodiment of the invention will be described with reference to the figures.

Figure 14:
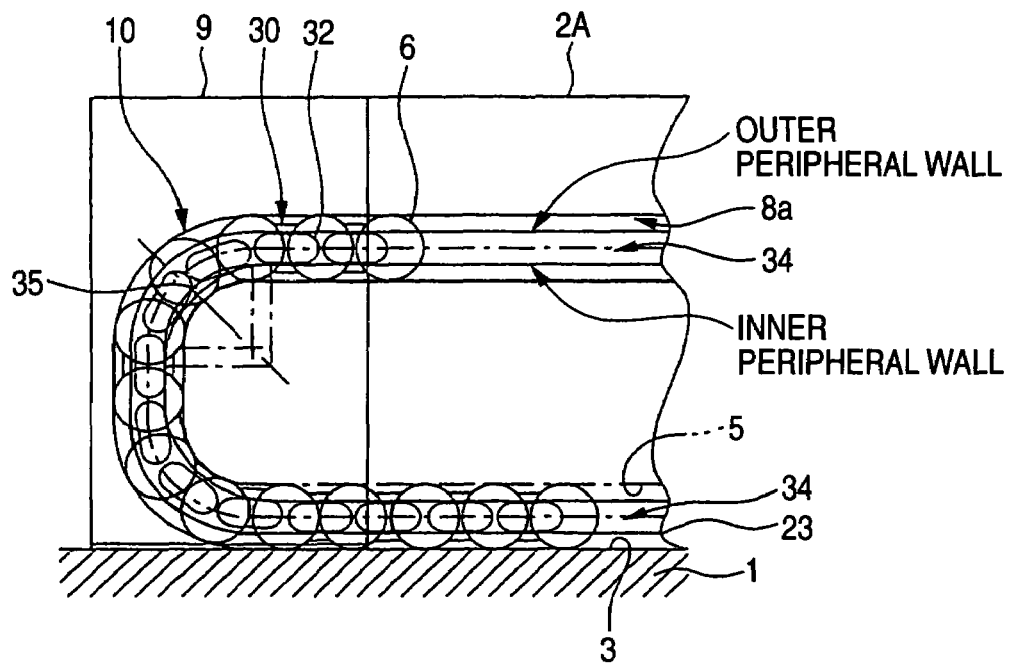
FIG. 14 is a diagram illustrating a roller raceway of a linear guide apparatus which is an embodiment of the invention.
Figure 15:
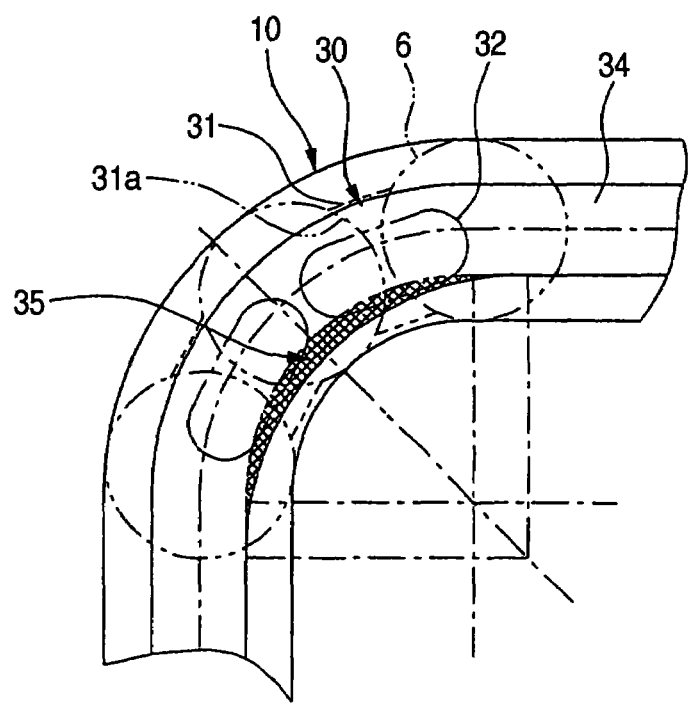
FIG. 15 is a diagram illustrating an escape portion.
Figure 16:
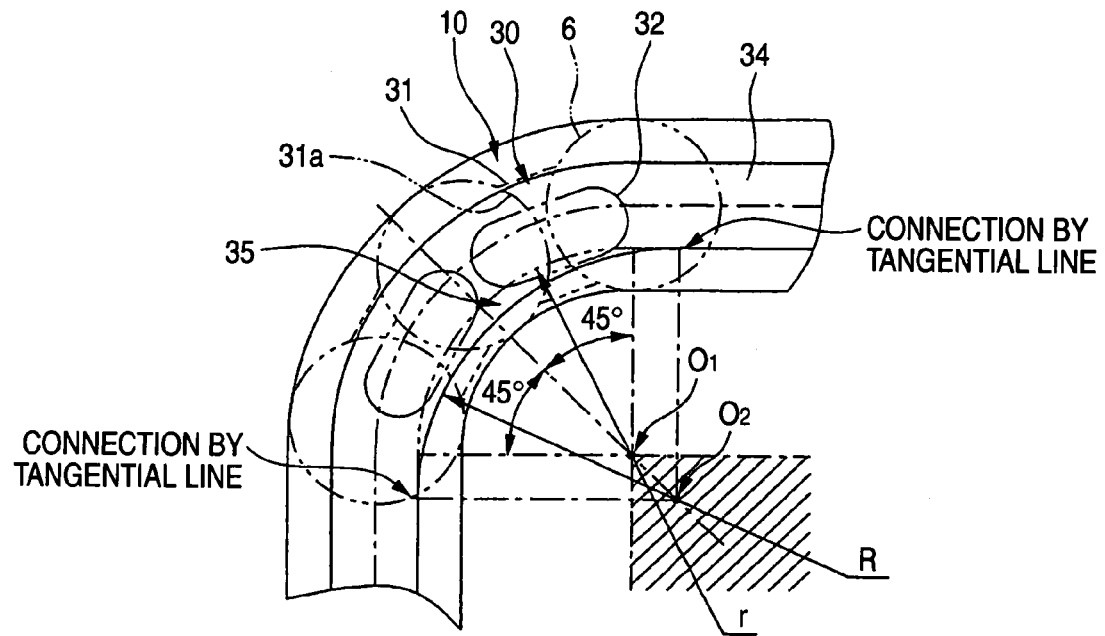
FIG. 16 is a diagram illustrating the escape portion in detail.
Figure 17:
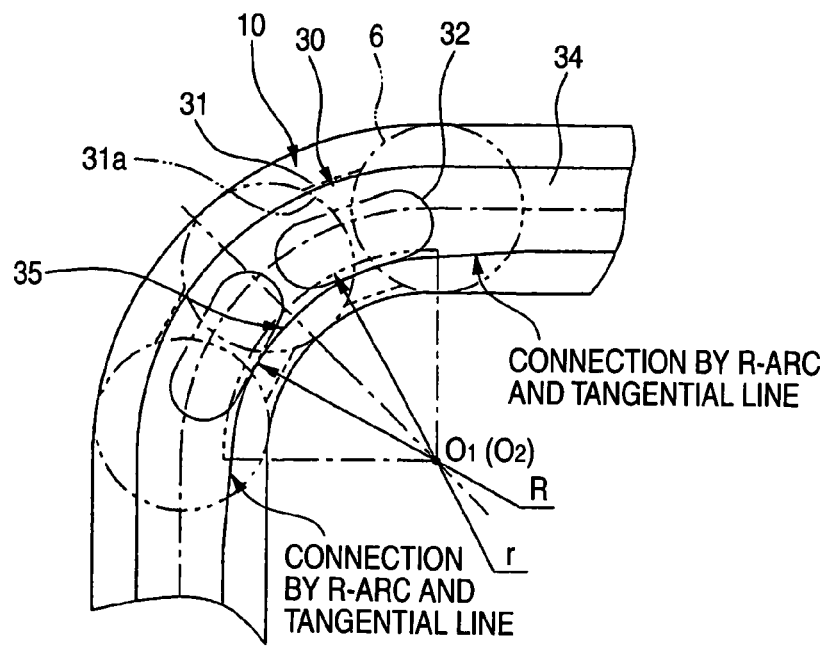
FIG. 17 is a diagram illustrating a modification of the escape portion.
Figure 18:
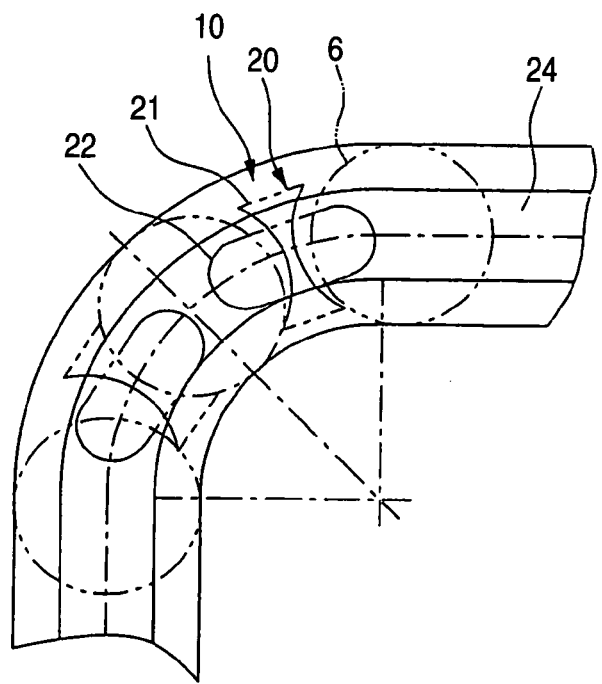
FIG. 18 is a diagram showing a direction change region of the conventional linear guide apparatus.
Figure 19:
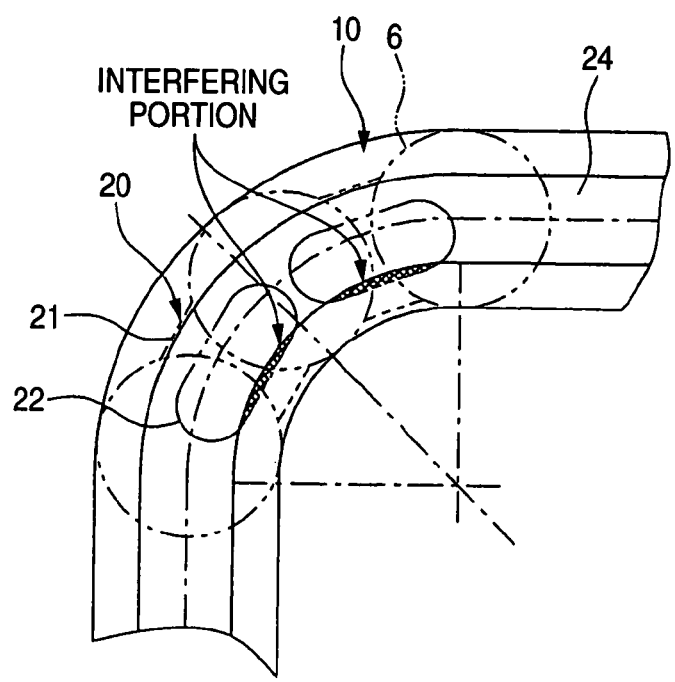
FIG. 19 is a diagram illustrating a problem in the direction change region shown in FIG. 18.

FIG. 14 is a diagram illustrating a roller raceway of a linear guide apparatus which is an embodiment of the invention, FIG. 15 is a diagram illustrating an escape portion, FIG. 16 is a diagram illustrating the escape portion in detail, FIG. 17 is a diagram illustrating a modification of the escape portion, FIG. 3 is a view of a separator as seen in the circulation direction of cylindrical rollers, FIG. 4 is a plan view of FIG. 3, and FIG. 5 is a side view of FIG. 4. In the following description of the embodiment, only points which are different from those of the conventional linear guide apparatus that has been described with reference to FIG. 13 will be described, and components identical with those of FIG. 13 are denoted by the same reference numerals.

First, a separator 30 will be described with reference to FIGS. 2 to 5. The separator 30 has: a separator body 31 interposed between adjacent ones of the cylindrical rollers 6; and arm portions 32 which are placed so as to sandwich the axial end faces of the cylindrical rollers 6, and which are integrated with the separator body 31. In the separator body 31, concavely curved faces 31a corresponding to the outer circumferential shape of the cylindrical rollers 6 are formed in portions respectively opposed to the outer peripheral faces of the cylindrical rollers 6.

In each of the arm portions 32, R-chamfering 33 of, for example, a single-arc shape is applied to end portions which are directed in the circulation direction of the cylindrical rollers 6, in order to suppress friction during circulation and prevent the arm portion from being caught by a step in the portion where the end cap 9 and the slider body 2A are connected to each other. Because of the same reasons, moreover, R-chamfering 31b is applied to tip ends of the concavely curved faces 31a of the separator body 31 (see FIG. 5). As the material of the separator 30, because there are portions where the separator body 31 and the arm portions 32 are connected to each other, engineering plastics such as PA66, or an elastomer is preferably used with the purposes of improvement of the strength and suppression of swelling of a lubricant and a rust preventing agent. Alternatively, a plastic material containing solid fat may be used with the purpose of improving the sliding properties among resin components.

When the cylindrical rollers 6 are circulated through the pair of rolling element rolling grooves 3, 5, the direction change paths 10, and the rolling element path 8a, the arm portions 32 of the separators 30 are guided along the circulation direction of the cylindrical rollers 6 by guide grooves 34 respectively disposed in the separator guide members 23 and the rolling element path 8a, and guide grooves 35 which are disposed in the direction change paths 10 (see FIG. 1).

In the embodiment, referring to FIG. 1, the widths (sizes) W1, W2 of the guide grooves 34, 35 are set to be larger than the width (size) W of the arm portions 32 of the separators 30, and the width W2 of the guide grooves 35 in the direction change regions is larger than the width W1 of the guide grooves 34 in the linear motion regions. This width increase is preferably conducted so that the groove width W1 is gradually changed to the groove width W2.

Hereinafter, the embodiment will be described in more detail.

FIG. 1 shows the movement locus of the arm portion 32 of each of the separators 30 in a raceway for the cylindrical rollers 6. In the figure, "−1", "−2", and "−3" which are added to the numeral 6 denoting the cylindrical rollers show movements of the cylindrical rollers 6, "A" indicates the front, and "B" indicates the rear. Namely, combinations of the cylindrical roller 6-1A (front) and the cylindrical roller 6-1B (rear), the cylindrical roller 6-2A (front) and the cylindrical roller 6-2B (rear), and the cylindrical roller 6-3A (front) and the cylindrical roller 6-3B (rear) are shown. Each of the separators 30 is interposed between the front and rear cylindrical rollers 6.

In movement of the arm portion 32 of the separator 30 from the guide groove 34 in the linear motion region to the guide groove 35 in the direction change region, when the center of the cylindrical roller 6 of the front side (indicated by A) in the movement direction passes through a section g at the position where the direction change region is connected to the linear motion region, the arm portion 32 starts to be inclined.

Specifically, the guide groove 35 in the direction change region is formed in the following manner. An arc which starts from intersection (2) of the section g and a line elongating along the linear wall face of the outer side of the guide groove 34 in the linear motion region, and which is drawn about the center of curvature O of the direction change path 10 is indicated by R0. When the center of the cylindrical roller 6 of the front side (indicated by A) in the movement direction passes through the section g, the arm portion 32 of the separator 30 gradually moves toward the inner side from the arc R0, and the position of the arm portion is changed so that, after both the centers of the front and rear cylindrical rollers 6 enter the direction change region, the locus reaches a constant shape, or the arc indicated by R' (the shape of the inner wall of the outer side of the guide groove 35).

In the guide grooves 34, 35, therefore, the shapes of the inner wall faces of the outer side start to be changed, at the position of the linear motion region indicated by (1), and the shapes of the inner wall faces of the inner side start to be changed, at the position of a section b of the linear motion region, and, after entering the direction change region, are changed to the constant arcuate shape indicated by Ri (the shape of the inner wall of the inner side of the guide groove 35) in the figure.

FIG. 6 shows results of calculations in which necessary widths of the guide grooves 34, 35 in sections a to q in FIG. 1 were calculated with using usual data of the linear guide apparatus.

From FIG. 6, the width of the guide groove 34 in an area to the position of the section b in the linear guide apparatus has a value at which a small clearance is formed with respect to the width of the arm portion 32 of the separator 30. The width of the guide groove 35 in an area from the section n of the direction change path is larger than the width of the guide groove 34 in the area to the position of the section b, by a degree corresponding to a geometrical shape which is defined by the radius of curvature of the direction change path 10.

When the center of the front cylindrical roller 6 in the movement direction passes through the section g, the arm portion 32 of the separator 30 gradually moves toward the inner side from the arc R0. However, the center of the rear cylindrical rollers 6 continues to conduct the linear motion until it reaches the section g. In order to prevent interference between the arm portion 32 and the guide grooves 34, 35, therefore, the widths of the guide grooves 34, 35 in the area between the position of the section b of the linear motion region and that of the section n of the direction change path are larger than the widths in the areas to the position of the section b and from that of the section n. Although the width of the guide groove 35 of the direction change path is slightly increased by the arcuate shape R0 in which the starting point is the intersection (2), the width is set as the constant value, whereby the required accuracy in the production can be easily attained.

In the embodiment, as described above, the widths (sizes) W1, W2 of the guide grooves 34, 35 which guide the arm portion 32 of the separator 30 in the circulation direction are set to be larger than the width (size) W of the arm portions 32, and the width W2 of the guide groove 35 in the direction change region is larger than the width W1 of the guide groove 34 in the linear motion region. Without causing the arm portions 32 to interfere with the guide grooves 34, 35, therefore, the widths of the guide groove 34 in the linear motion region and the guide groove 35 in the direction change region can be set to ideal values, and the sizes of the gaps between the arm portion 32 of the separator 30 and the guide grooves 34, 35 can be made optimum in both the linear motion region and the direction change region.

As a result, in the endless circulation raceway, when the separator 30 and the cylindrical roller 6 are moved with being pushed by the rear cylindrical roller 6, it is possible to suppress the separator 30 from producing a zigzag motion, and hence the axis-to-axis distance of the adjacent cylindrical rollers 6 is less changed, so that a satisfactory operation ability can be ensured.

Since the width of the guide groove 34 is made larger at the position which is on the side of the linear motion region with respect to the position where the linear motion region is connected to the direction change region, the guide groove elongating from the linear motion region to the direction change region can be formed as a smooth arcuate raceway. Therefore, the operation ability can be further improved.

The linear guide apparatus of the invention is not restricted to the embodiment described above, and may be adequately modified without departing from the spirit of the invention.

Figure 7A:
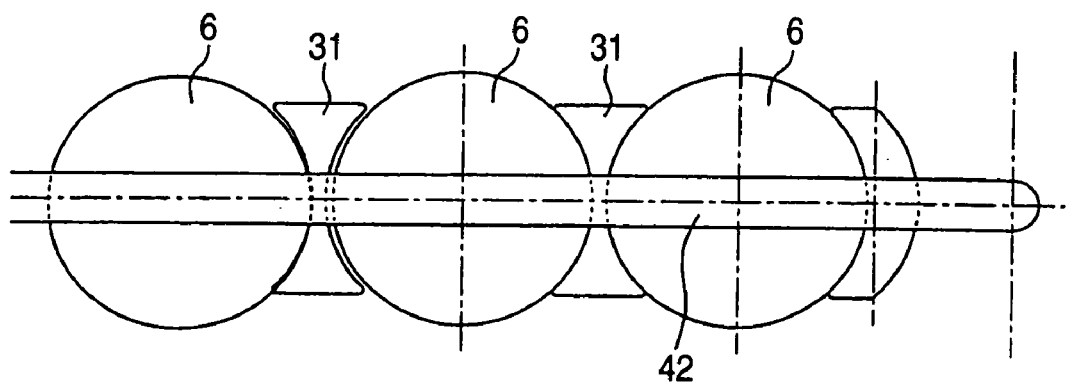
Figure 7B:
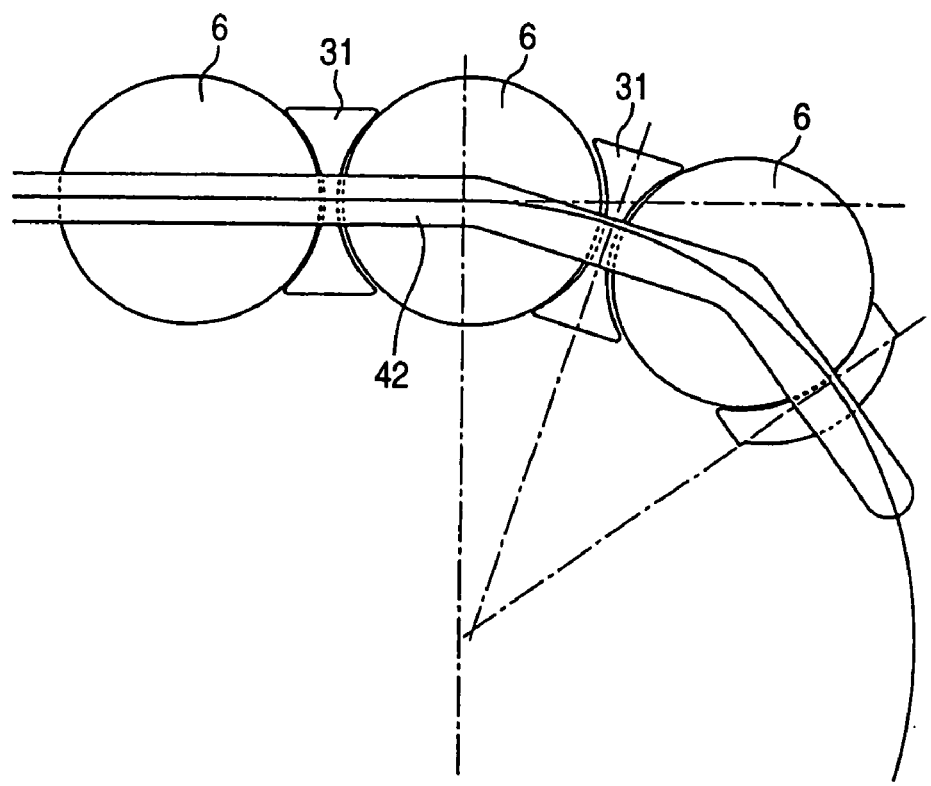

In the embodiment described above, the cylindrical rollers 6 are restrained by the arm portions 32 of the separators 30. Alternatively, for example, an arm portion 42 which, as shown in FIGS. 7A and 7B, forms a band-like shape along the circulation direction of the cylindrical rollers 6, or arm portions 52 which, as shown in FIGS. 8A and 8B, have a projection 52a that is connectable to an axial end face of corresponding one of the cylindrical rollers 6 may be employed.

When the arm portion 42 or the arm portions 52 are employed, each separator can be moved by a pulling operation even when the separator is not pushed by the rear cylindrical roller 6. Therefore, the effect of suppressing the separator from producing a zigzag motion is further enhanced.

In the case where the arm portion 42 or the arm portions 52 are employed, a change of the raceway length due to the phase change of the cylindrical rollers 6 must be absorbed by the arm portion 42 or the arm portions 52. Therefore, an elastomer or the like is preferably used as the material of the arm portions.

In the embodiment described above, the R-chamfered portion 33 of the end portions of each of the arm portions 32 of the separators 30 is formed as a single-arc shape which is connected to the linear portion of the arm portion 32 through a tangential line, in order to suppress friction during circulation and prevent the arm portion from being caught by a step in the portion where the end cap 9 and the slider body 2A are connected to each other. The R-chamfering is not restricted to this. Alternatively, for example, an R-chamfered portion 43 which, as shown in FIG. 9, is formed by combining arcs and a straight line with one another, or an R-chamfered portion 53 having a Gothic arch shape which, as shown in FIG. 10, is not connected to the linear portion of the arm portion 32 through a tangential line may be employed.

In a curved portion such as the guide groove 35 in the direction change region, in the case where the linear portion of the arm portion 32 extends along the wall face of the guide groove 35 so as to attain a gapless state in view of an ideal state (the case where the width of the guide groove 35 has at least a size at which the groove does not interfere with the arm portion 32, see FIG. 11A), it is supposed that the size relationship of the widths of the guide groove 35 and the arm portion 32 is inverted at the point 0 in FIG. 11A, and the operation ability is adversely affected.

Figure 11B:
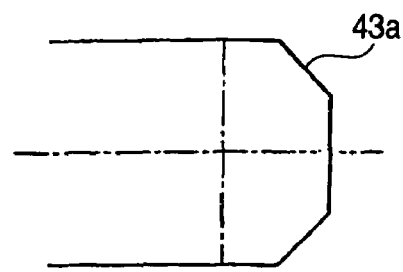
FIGS. 11B and 11C show another embodiments of chamfered portion of the end portions of each of the arm portions of the separators.
Figure 11C:
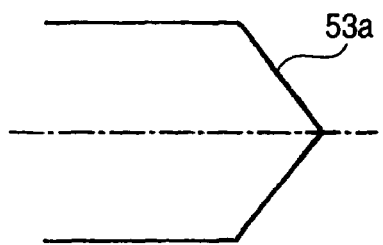

FIGS. 11B and 11C show another embodiments of chamfered portion of the end portions of each of the arm portions of the separators. In the above embodiments, there are shown the R-chamfered portion of the end portions of each of the arm portions of the separators. However, the R-chamfered portions can be changed in linear-chamfered portions 43a and 53a as shown in the FIGS. 11B and 11C.

FIG. 12 shows the range of interference between the R-chamfered portion 33 and the inner wall face of the outer side of the guide groove 35 in which the position of the R-chamfered portion 33 in the circumferential direction from the point 0 in FIG. 11A is x, the position of the R-chamfered portion 33 in the diameter direction (the width direction of the arm portion 32) of the single arc is y, and the position of x=0 mm and y=0.9 mm is the point 0 in FIG. 11A. From FIG. 12, it is known that the shape of the inner wall face of the outer side of the guide groove 35 is actually smaller than that of the R-chamfered portion 33 of the end portion of the arm portion 32.

In order to eliminate such interference, therefore, the end portion is preferably formed as the above-mentioned R-chamfered portion 53 of a Gothic arch shape.

As shown in FIG. 16, the escape portion 35 is formed into a single R-arcuate shape which is larger in radius of curvature than an R-arc (in the embodiment, a 90-degree arc) of the inner peripheral wall of the guide groove 34 in the region of the direction change path 10 in which the escape portion 35 has not yet been disposed. The escape portion is placed inner than the inner peripheral wall of the guide groove 34. The center of curvature $O_2$ is positioned on an extended line which passes the center of curvature $O_1$ of the R-arc of the inner peripheral wall of the guide groove 34 to equally divide the R-arc into 45-degree subportions. The escape portion is formed as a 90-degree by the 45-degree subportions which are respectively on both the sides of the extended line. In the embodiment, the escape portion 35 is connected by tangential lines to the inner peripheral wall of the guide groove 34 which is positioned on both the sides in the circumferential direction of the escape portion 35. In the figure, R indicates the radius of curvature of the escape portion 35, and r indicates the radius of curvature of the inner peripheral wall of the guide groove 34 in which the escape portion 35 has not yet been disposed.

In the embodiment, as described above, the escape portion 35 which escapes toward the inner side of the direction change path 10 is disposed in the R-arcuate inner peripheral wall of the guide groove 34 in the region of the direction change path 10. Therefore, the arm portion 32 of the separator 30 in the direction change region is prevented from interfering with the inner peripheral wall of the guide groove 34, so that, in the direction change path 10, the roller 3 can circulate in a state where the roller is always in close contact with the concavely curved face 31a of the separator body 31.

As a result, the intervals of the cylindrical rollers 6 can be prevented from fluctuating in the direction change region, whereby vibrations are suppressed to ensure a stable operation, and the life period of the separator 30 can be prolonged.

The linear guide apparatus of the invention is not restricted to the embodiment described above, and may be adequately modified without departing from the spirit of the invention.

In the embodiment described above, the escape portion 35 is formed into a single R-arcuate shape which is larger in radius of curvature than the R-arc of the inner peripheral wall of the guide groove 34 in the region of the direction change path 10 in which the escape portion 35 has not yet been disposed. Alternatively, as shown in FIG. 17, for example, the escape portion 35 may be formed into an R-arcuate shape which is smaller in radius of curvature than the R-arc of the inner peripheral wall of the guide groove 34 in the region of the direction change path 10 in which the escape portion 35 has not yet been disposed, the center of curvature $O_2$ may be coincident with the center of curvature $O_1$ of the R-arc of the inner peripheral wall of the guide groove 34 to be placed inner than the inner peripheral wall of the guide groove 34, and the inner peripheral wall of the guide groove 34 which is positioned on both the sides in the circumferential direction of the escape portion 35 may be connected to the escape portion 35 by R-arcs and tangential lines.

Hereinafter, an embodiment of the invention will be described with reference to the figures.

Figure 20:
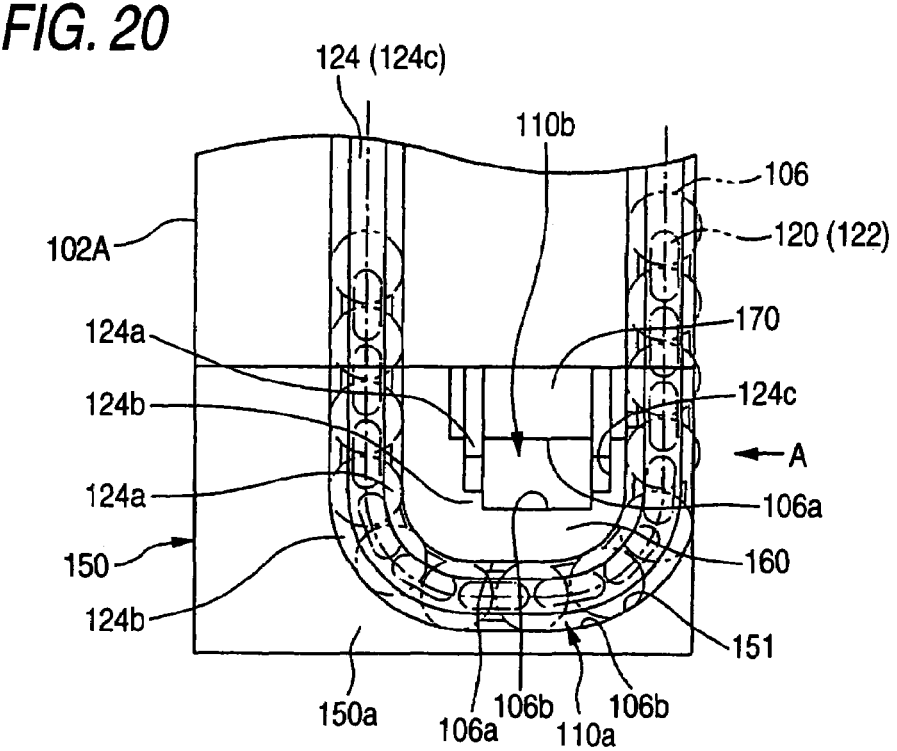
FIG. 20 is a diagram illustrating main portions of a linear guide apparatus which is an embodiment of the invention.
Figure 21:
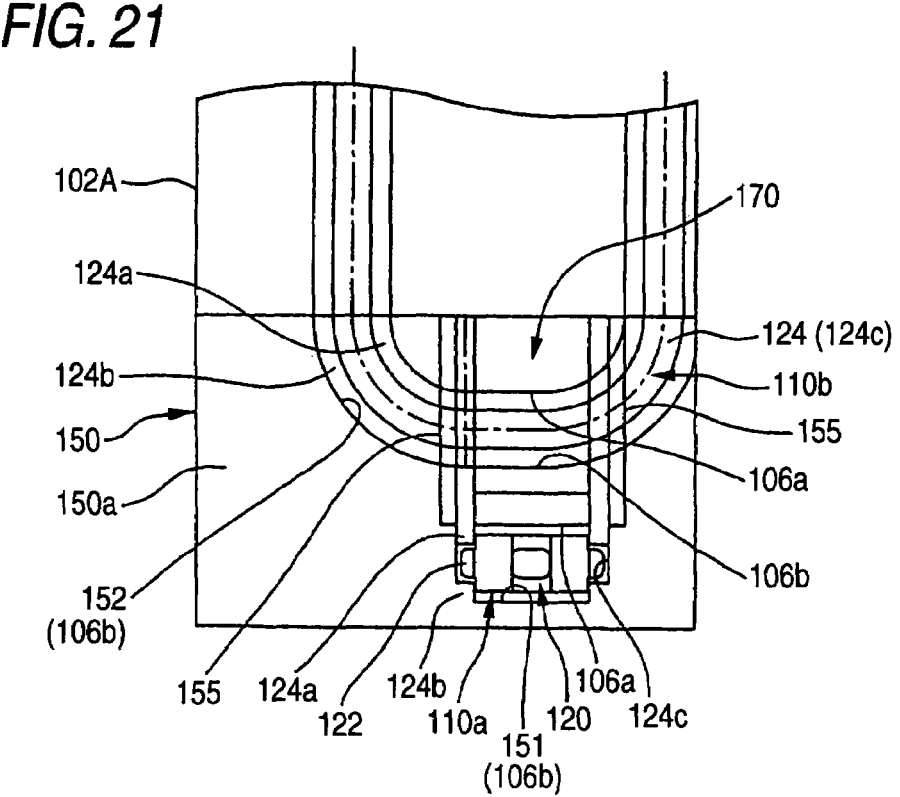
FIG. 21 is a diagram of the internal structure as seen in the direction of the arrow A in FIG. 20.
Figure 22:
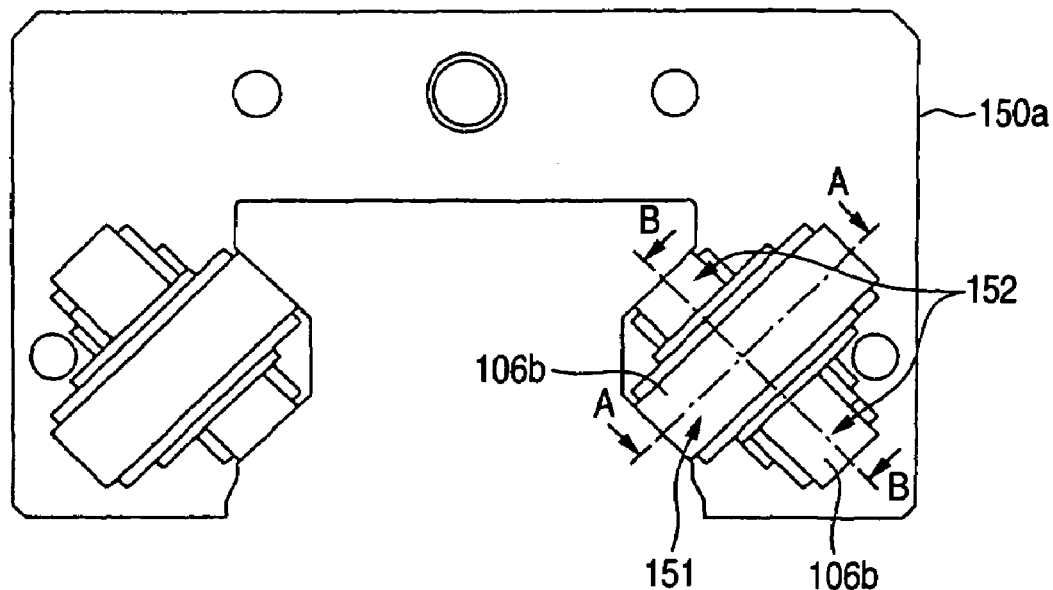
FIG. 22 is a view showing a face of an end cap body which faces an end face of a slider body.
Figure 23:
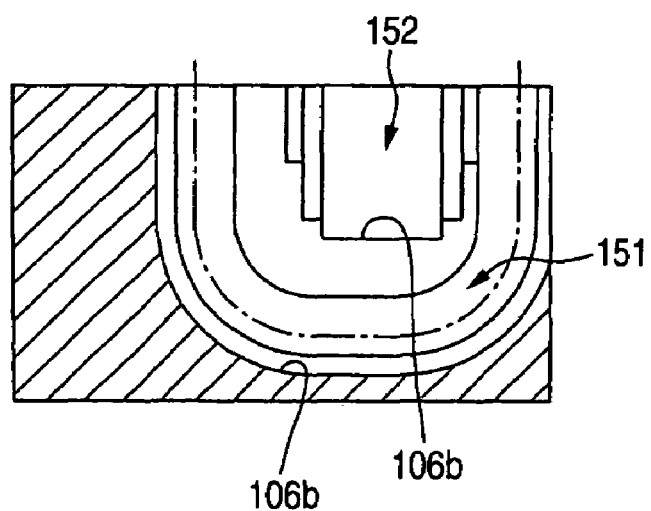
FIG. 23 is a section view taken along the line A-A in FIG. 22.
Figure 24:
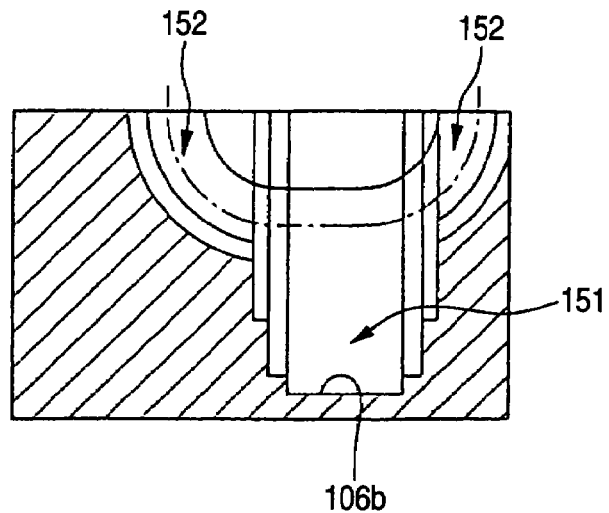
FIG. 24 is a section view taken along the line B-B in FIG. 22.
Figure 25:
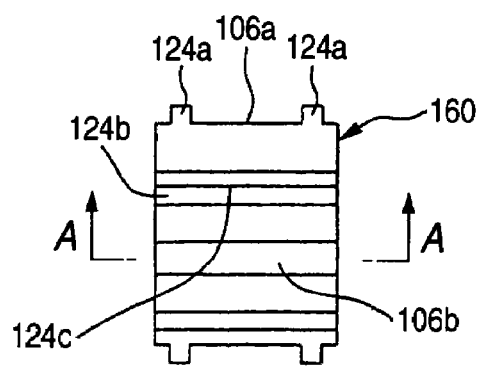
FIG. 25 is a view of a first return guide as seen in an axial direction (fitting direction) from the side of the end face of the slider body.
Figure 26:
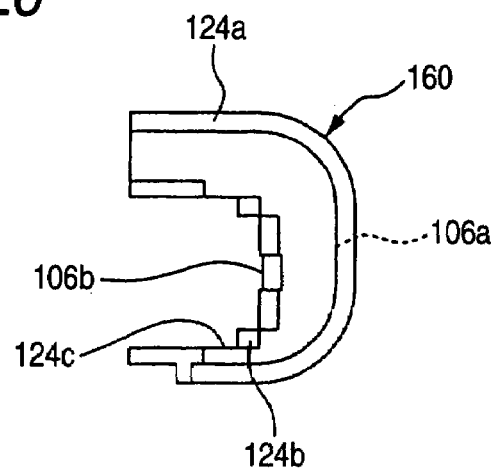
FIG. 26 is a right side view of FIG. 25.
Figure 27:
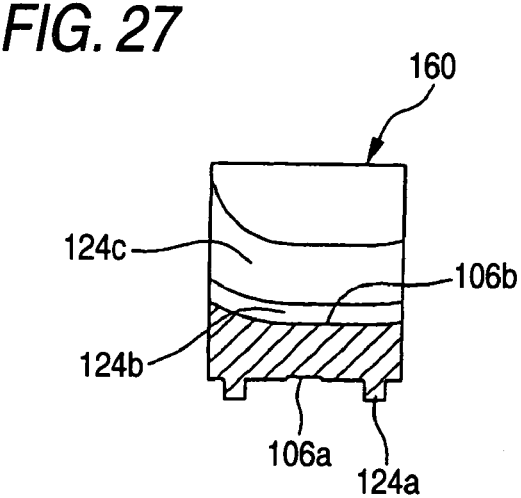
FIG. 27 is a section view taken along the line A-A in FIG. 25.
Figure 28:
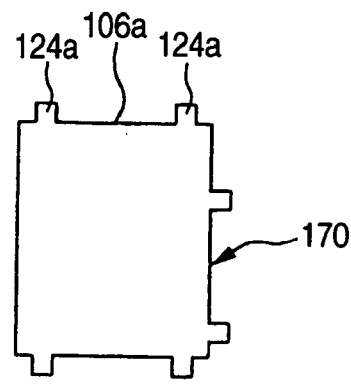
FIG. 28 is a view of a second return guide as seen in the axial direction (fitting direction) from the side of the end face of the slider body.
Figure 29:
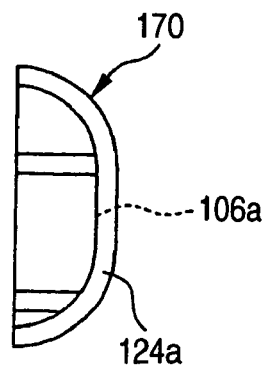
FIG. 29 is a right side view of FIG. 28.
Figure 33:
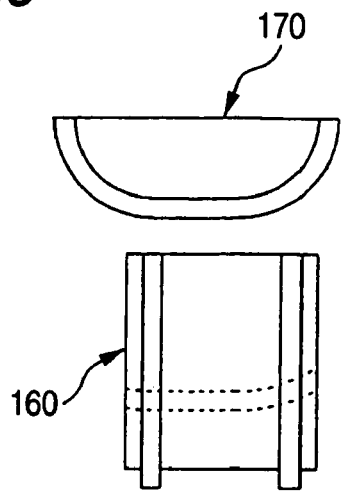
FIG. 33 is a view showing a state before fitting of the first return guide and the second return guide.
Figure 34:
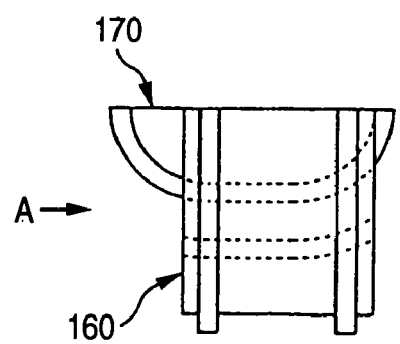
FIG. 34 is a view showing a state where the first return guide and the second return guide are fitted.
Figure 35:
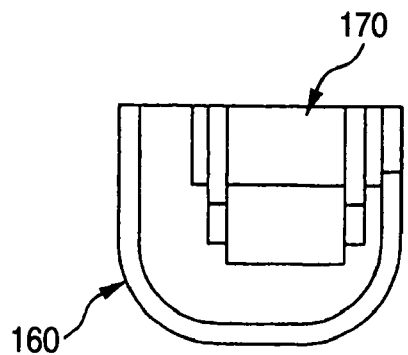
FIG. 35 is a view as seen from the arrow A in FIG. 34.
Figure 36:
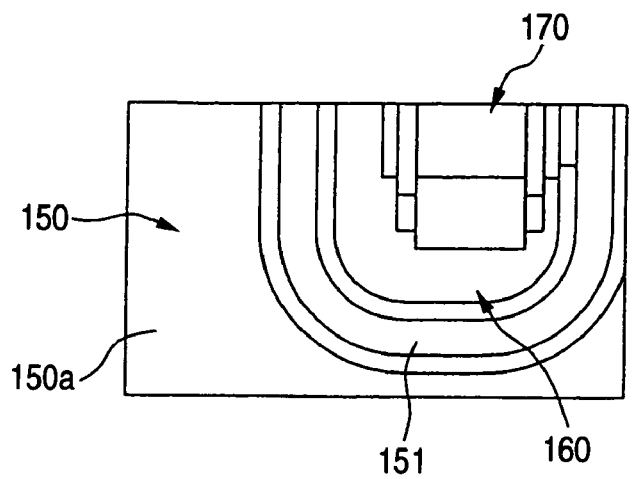
FIG. 36 is a view showing a state where the first return guide is fitted to the end cap body under a state where the second return guide is fitted to the first return guide.
Figure 37:
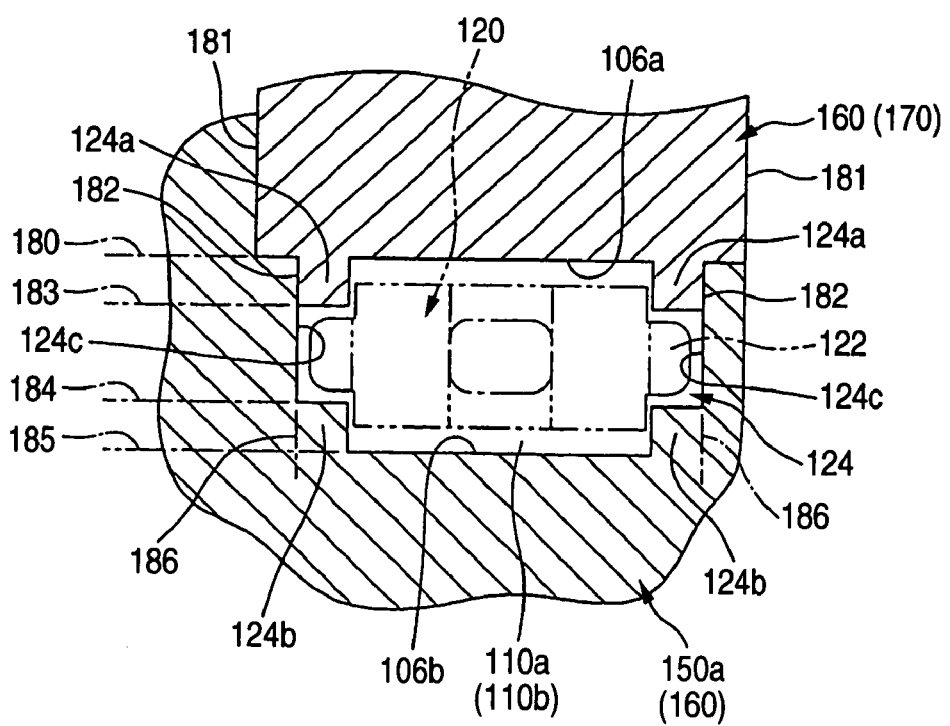
FIG. 37 is a section view illustrating a split position of the first return guide and the second return guide, and that of the first return guide and the end cap body.

FIG. 20 is a diagram illustrating main portions of a linear guide apparatus which is an embodiment of the invention, FIG. 21 is a diagram of the internal structure as seen in the direction of the arrow A in FIG. 20, FIG. 22 is a view showing a face of an end cap body which faces an end face of a slider body, FIG. 23 is a section view taken along the line A-A in FIG. 22, FIG. 24 is a section view taken along the line B-B in FIG. 22, FIG. 25 is a view of a first return guide as seen in an axial direction (fitting direction) from the side of the end face of the slider body, FIG. 26 is a right side view of FIG. 25, FIG. 27 is a section view taken along the line A-A in FIG. 25, FIG. 28 is a view of a second return guide as seen in the axial direction (fitting direction) from the side of the end face of the slider body, FIG. 29 is a right side view of FIG. 28, FIG. 30 is a bottom view of FIG. 28, FIG. 31 is a section view showing a structure of fitting the end cap body, the first return guide, and the second return guide, FIG. 32 is a section view showing the internal structure as seen in the direction of the arrow A in FIG. 31, FIG. 33 is a view showing a state before fitting of the first return guide and the second return guide, FIG. 34 is a view showing a state where the first return guide and the second return guide are fitted, FIG. 35 is a view as seen from the arrow A in FIG. 34, FIG. 36 is a view showing a state where the first return guide is fitted to the end cap body under a state where the second return guide is fitted to the first return guide, FIG. 37 is a section view illustrating a split position of the first return guide and the second return guide, and that of the first return guide and the end cap body, and FIGS. 38 to 47 are section views respectively showing modifications of the structure of fitting the end cap body, the first return guide, and the second return guide.

Figure 48:
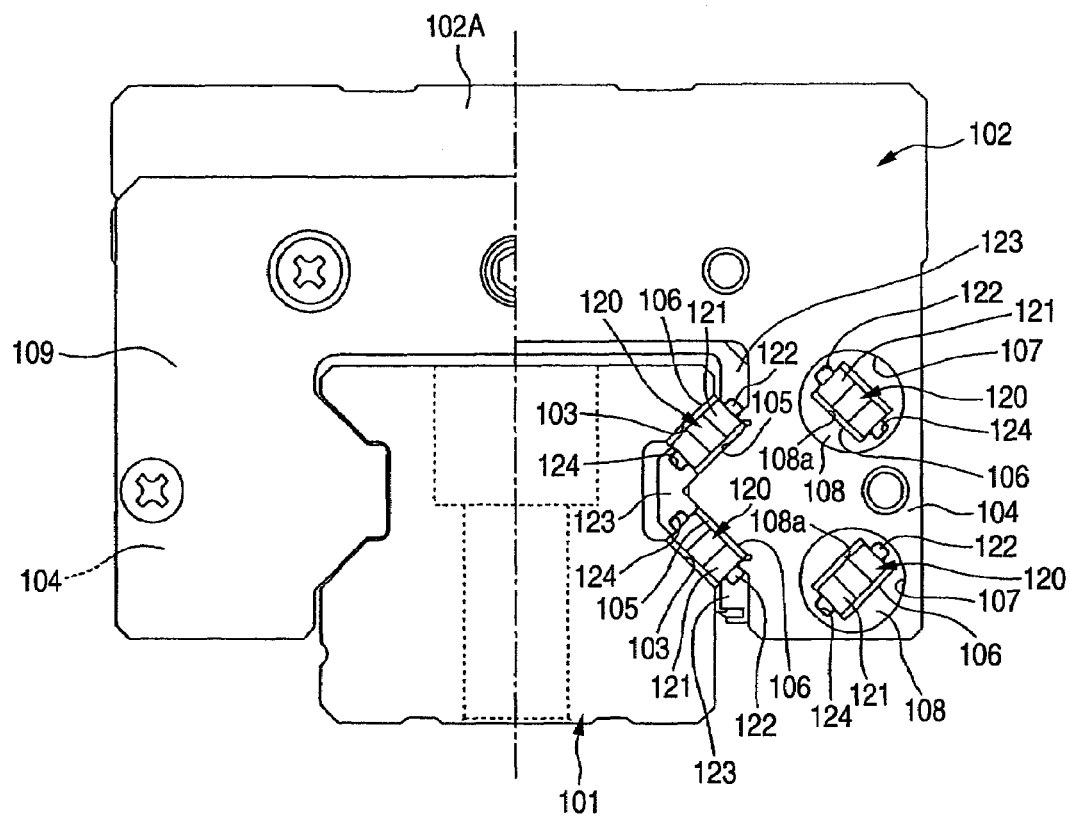
FIG. 48 is a partially cutaway view showing an example of a conventional linear guide apparatus.
Figure 49:
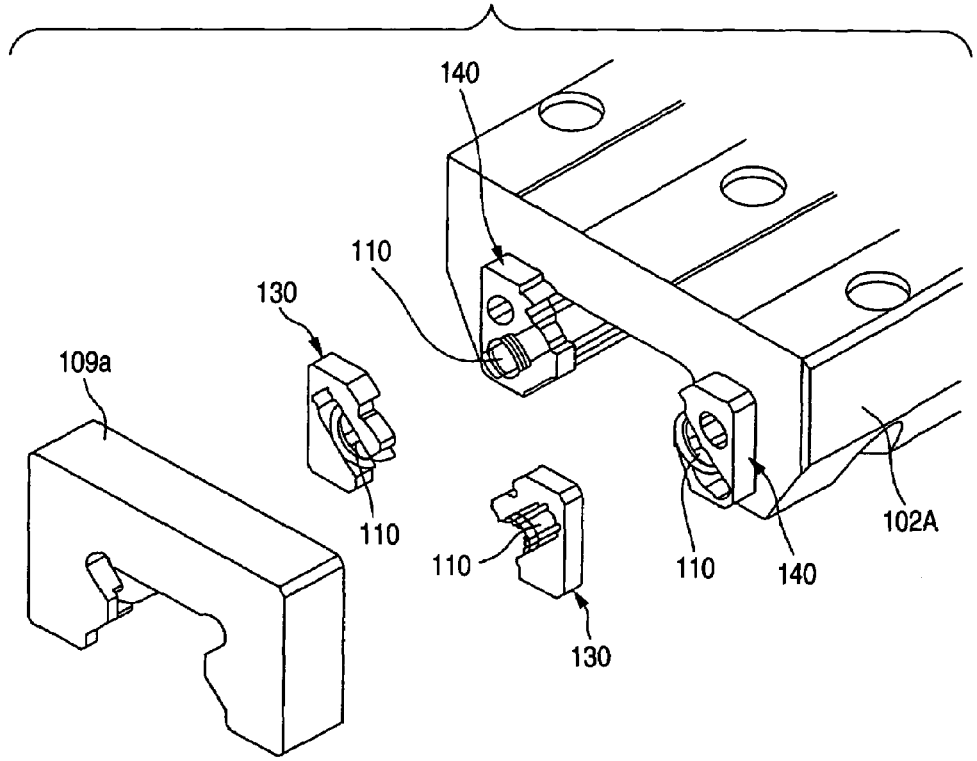
FIG. 49 is an exploded perspective view illustrating the structure of a conventional end cap.
Figure 50:
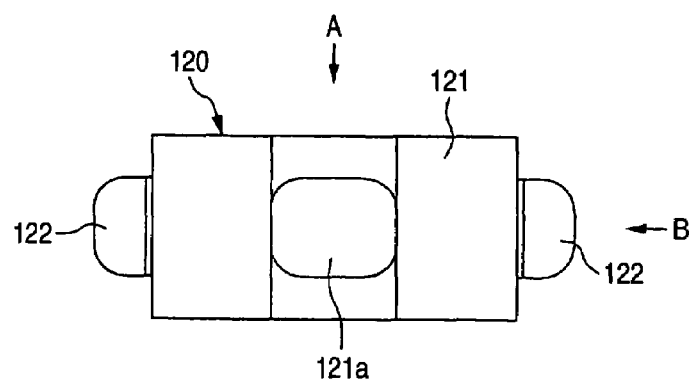
FIG. 50 is a view of a separator as seen in the circulation direction.
Figure 51:
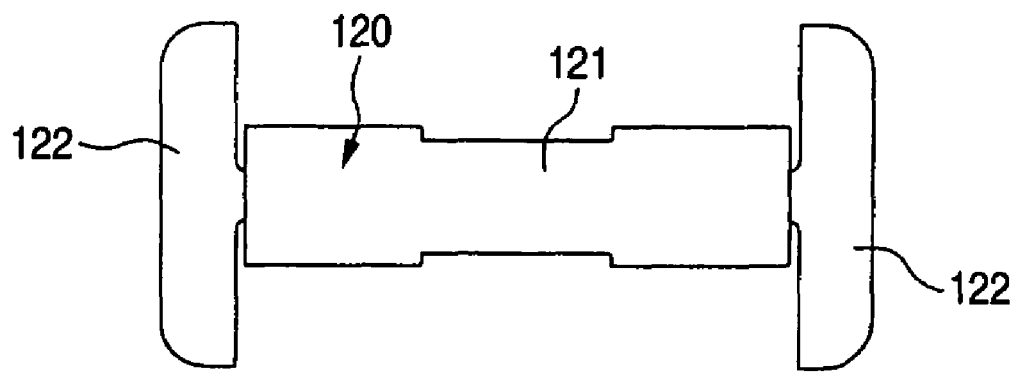
FIG. 51 is a view as seen in the direction of the arrow A in FIG. 50.
Figure 52:
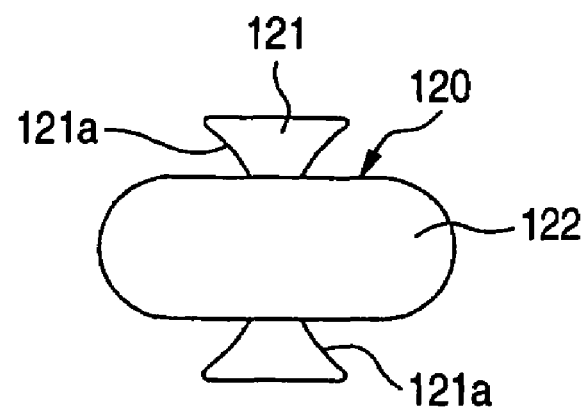
FIG. 52 is a view as seen in the direction of the arrow B in FIG. 50.

In the following description of the embodiment, a linear guide apparatus having a similar basic configuration as that of the conventional linear guide apparatus which has been described with reference to FIG. 48 will be described. The identical components are denoted in the figures by the same reference numerals, and their description is omitted.

In a linear guide apparatus which is an embodiment of the invention, as shown in FIGS. 20 and 21, an end cap 150 fixed to an end face of the slider body 102A has: an end cap body 150a; a first return guide 160 which is fitted in an axial direction to a side of the end cap body 150a that faces the end face of the slider body 102A; and a second return guide 170 which is fitted in the axial direction to the first return guide 160. The first return guide 160 and the second return guide 170 are substantially perpendicularly arranged to form a generally rectangular shape in which an inner peripheral raceway groove 106a for the cylindrical rollers 106 is disposed on a short side as seen in the axial direction.

In the embodiment, the first return guide 160 and the end cap body 150a form a direction change path 110a through which the upper rolling element path 108a communicates with the lower pair of rolling element rolling grooves 103, 105, and the second return guide 170, the first return guide 160, and the end cap body 150a form a direction change path 110b through which the lower rolling element path 108a communicates with the upper pair of rolling element rolling grooves 103, 105.

As shown in FIGS. 25 to 27, the first return guide 160 has a generally U-like shape. End portions in the circumferential direction are opposed to each other in the longitudinal direction as seen in the axial direction of the slider body 102A. The inner peripheral roller raceway groove 106a of the direction change path 110a is formed along the U-shaped outer peripheral face. A part of an outer peripheral roller raceway groove 106b (see FIG. 27) of the direction change path 110b is formed in a bottom portion of the inner peripheral face so as to be substantially perpendicular to the inner peripheral roller raceway groove 106a.

A bottom portion of the outer peripheral face of the first return guide 160 is fitted in the axial direction to a fitting recess 151 formed in the end cap body 150a.

As shown in FIGS. 22 to 24, the fitting recess 151 is concavely formed in a generally U-like shape in a face of the end cap body 150a which faces the end face of the slider body 102A, in accordance with the shape of the first return guide 160. The outer peripheral roller raceway groove 106b of the direction change path 110a is formed along the U-shaped bottom face of the fitting recess 151.

The outer peripheral roller raceway groove 106b of the fitting recess 151, and the inner peripheral roller raceway groove 106a of the first return guide 160 form the direction change path 110a through which the upper rolling element path 108a communicates with the lower pair of rolling element rolling grooves 103, 105.

A U-shaped recess 152 which is shallower than the fitting recess 151 is formed in the end cap body 150a so as to be substantially perpendicular to the fitting recess 151. In a bottom portion of the U-shaped recess 152, the outer peripheral roller raceway groove 106b of the direction change path 110b is formed so as to be flush with the outer peripheral roller raceway groove 106b of the direction change path 110b which is partly formed in the bottom portion of the inner peripheral face of the first return guide 160.

As shown in FIGS. 28 and 29, the second return guide 170 has a substantially arcuate shape in which the dimension in the axial direction of the slider body 102A is shorter than that of the first return guide 160. End portions in the circumferential direction are opposed to each other in the longitudinal direction as seen in the axial direction of the slider body 102A. The inner peripheral roller raceway groove 106a of the direction change path 110b is formed along the arcuate outer peripheral face.

A bottom portion on the outer peripheral side of the second return guide 170 is fitted in the axial direction to the inner peripheral side of the first return guide 160 so that the longitudinal direction is substantially perpendicular to that of the first return guide 160. Under the fitting state, the inner peripheral roller raceway groove 106a on the outer peripheral side of the second return guide 170, the outer peripheral roller raceway groove 106b which is formed in the bottom portion of the U-shaped recess 152 of the end cap body 150a, and the outer peripheral roller raceway groove 106b which is partly formed in the bottom portion of the inner peripheral face of the first return guide 160 form the direction change path 110b through which the lower rolling element path 108a communicates with the upper pair of rolling element rolling grooves 103, 105, so as to overpass the direction change path 110a.

In the embodiment, two split planes 155 which cross the outer peripheral roller raceway groove 106b in the roller axis direction are formed in the portion where the outer peripheral roller raceway groove 106b which is formed in the bottom portion of the U-shaped recess 152 of the end cap body 150a is connected to the outer peripheral roller raceway groove 106b which is partly formed in the bottom portion of the inner peripheral face of the first return guide 160.

The end cap body 150a, the first return guide 160, and the second return guide 170 are fitted in the following procedure. As shown in FIGS. 33 to 36, the first return guide 160 and the second return guide 170 are first fitted to each other, and the first return guide 160 is then fitted to the fitting recess 151 of the end cap body 150a. Alternatively, the first return guide 160 may be first fitted to the fitting recess 151 of the end cap body 150a, and the second return guide 170 may be then fitted to the first return guide 160.

Next, a guide groove 124 which is disposed in each of the direction change paths 110a, 10b to guide the arm portion 122 of each separator 120 will be described.

In both ends in the roller axis direction of the inner peripheral roller raceway groove 106a which is disposed in the outer periphery of the first return guide 160, an inner periphery support wall 124a of the guide groove 124 which is disposed in the direction change path 110a is formed along the U-shaped outer peripheral face of the first return guide 160. An outer periphery support wall 124b of the guide groove 124 which is disposed in the direction change path 110b is formed in both ends in the roller axis direction of the outer peripheral roller raceway groove 106b which is disposed in the inner peripheral bottom portion of the first return guide 160. In both ends in the roller axis direction of the inner peripheral roller raceway groove 106a which is disposed in the outer periphery of the second return guide 170, the inner periphery support wall 124a of the guide groove 124 which is disposed in the direction change path 110b is formed along the arcuate outer peripheral face of the second return guide 170.

In both ends in the roller axis direction of the outer peripheral roller raceway groove 106b which is disposed in the fitting recess 151 of the end cap body 150a, the outer periphery support wall 124b of the guide groove 124 which is disposed in the direction change path 110a is formed along the U-like shape of the fitting recess 151. In both ends in the roller axis direction of the outer peripheral roller raceway groove 106b which is disposed in the U-shaped recess 152 of the end cap body 150a, the outer periphery support wall 124b of the guide groove 124 which is disposed in the direction change path 110b is formed so as to be flush with the outer periphery support wall 124b which is disposed in the inner peripheral bottom portion of the first return guide 160. With respect to also the guide groove 124, therefore, two split planes 155 are formed in the portion where the outer periphery support wall 124b which is formed in the U-shaped recess 152 of the end cap body 150a is connected to the outer periphery support wall 124b which is formed in the inner peripheral bottom portion of the first return guide 160.

In the embodiment, as shown in FIG. 31, a bottom face 124c of the guide groove 124 which is disposed in the direction change path 110a is disposed in the end cap body 150a. The split plane between the first return guide 160 and the end cap body 150a is on an extended plane 180 (see FIG. 37) in the roller axis direction of the inner peripheral roller raceway groove 106a of the first return guide 160. The positioning face and the engaging face of the first return guide 160 with respect to the end cap body 150a in the vertical direction in FIG. 31 are on the roller axis extended plane 180 of the inner peripheral roller raceway groove 106a. The positioning face and the engaging face of the first return guide 160 in the lateral direction in FIG. 31 are a side face 181 (see FIG. 37) of the first return guide 160, or an outer side face 182 (see FIG. 37) of the inner periphery support wall 124a of the guide groove 124 which is formed along the U-shaped outer peripheral face of the first return guide 160.

As shown in FIG. 32, the bottom face 124c of the guide groove 124 which is disposed in the direction change path 110a is disposed in the direction change path 110b is disposed in the inner peripheral bottom portion of the first return guide 160, and the U-shaped recess 152 of the end cap body 150a. The split plane between the second return guide 170 and the first return guide 160 is on an extended plane 180 (see FIG. 37) in the roller axis direction of the inner peripheral roller raceway groove 106a of the second return guide 170. The positioning face and the engaging face of the second return guide 170 with respect to the first return guide 160 in the vertical direction in FIG. 32 are on the roller axis extended plane 180 of the inner peripheral roller raceway groove 106a. The positioning face and the engaging face of the second return guide 170 in the lateral direction in FIG. 32 are a side face 181 (see FIG. 37) of the second return guide 170, or an outer side face 182 (see FIG. 37) of the inner periphery support wall 124a of the guide groove 124 which is formed along the arcuate outer peripheral face of the second return guide 170.

As seen from the above description, in the embodiment, the first return guide 160 which is to be axially fitted to the fitting recess 151 of the end cap body 150a, and the second return guide 170 which is to be axially fitted to the first return guide 160 are substantially perpendicularly arranged to form a generally rectangular shape in which the raceway groove 106a is disposed on a short side as seen in the axial direction of the slider body 102A. Therefore, the shapes of the first return guide 160 and the second return guide 170 can be simplified so that requirement of a high molding accuracy can be avoided. Moreover, the work of fitting the first return guide 160 and the second return guide 170 in the axial direction can be easily conducted. As a result, the assembly work can be efficiently conducted, and hence the production cost can be reduced.

Moreover, only two the split planes 155 which cross in the roller axis direction are formed in the outer peripheral roller raceway groove 106b of the direction change path 110b that is formed by the second return guide 170, the end cap body 150a, and the first return guide 160. Therefore, the number of steps in joining portions in the split planes 155 is smaller than that in the conventional art. As a result, the guiding accuracy of the rollers can be improved, and the operation ability can be enhanced.

With respect to also the guide groove 124 which guides the arm portion 122 of the separator 120 in the direction change path 110b along the circulation direction, the number of steps in joining portions in the split planes 155 can be reduced in the same manner as the case of the roller raceway groove 106b. Therefore, the guiding accuracy of the arm portion 122 of the separator 120 can be improved, and the operation ability can be enhanced.

The linear guide apparatus of the invention is not restricted to the embodiment described above, and may be adequately modified without departing from the spirit of the invention.

In the embodiment described above, the first return guide 160 and the end cap body 150a form the direction change path 110a through which the upper rolling element path 108a communicates with the lower pair of rolling element rolling grooves 103, 105, and the second return guide 170, the first return guide 160, and the end cap body 150a form the direction change path 110b through which the lower rolling element path 108a communicates with the upper pair of rolling element rolling grooves 103, 105. Alternatively, the first return guide 160 and the end cap body 150a may form the direction change path 110b through which the lower rolling element path 108a communicates with the upper pair of rolling element rolling grooves 103, 105, and the second return guide 170, the first return guide 160, and the end cap body 150a may form the direction change path 110a through which the upper rolling element path 108a communicates with the lower pair of rolling element rolling grooves 103, 105.

Figure 38:
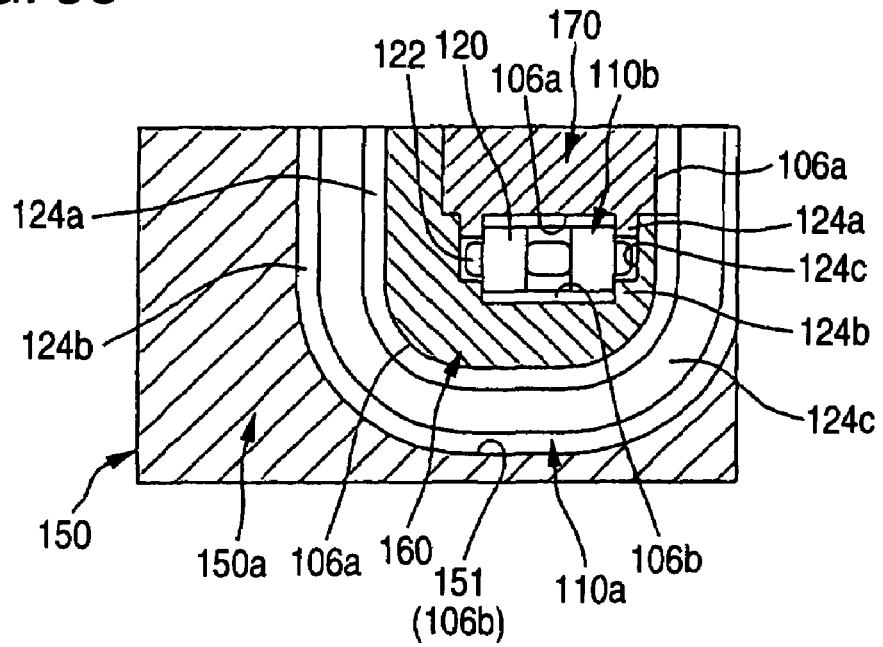
FIG. 38 is a section view showing a modification of the structure of fitting the first return guide and the second return guide.

In the embodiment described above, the whole inner peripheral roller raceway groove 106a which forms the direction change path 110a is disposed in the outer periphery of the first return guide 160. The configuration is not limited to this. As shown in FIG. 38, for example, a part of the inner peripheral roller raceway groove 106a which forms the direction change path 110a may be disposed in the second return guide 170.

Hereinafter, modifications of the structure of fitting the end cap body 150a and the first and second return guides will be described with reference to FIGS. 39 to 47.

Figure 39:
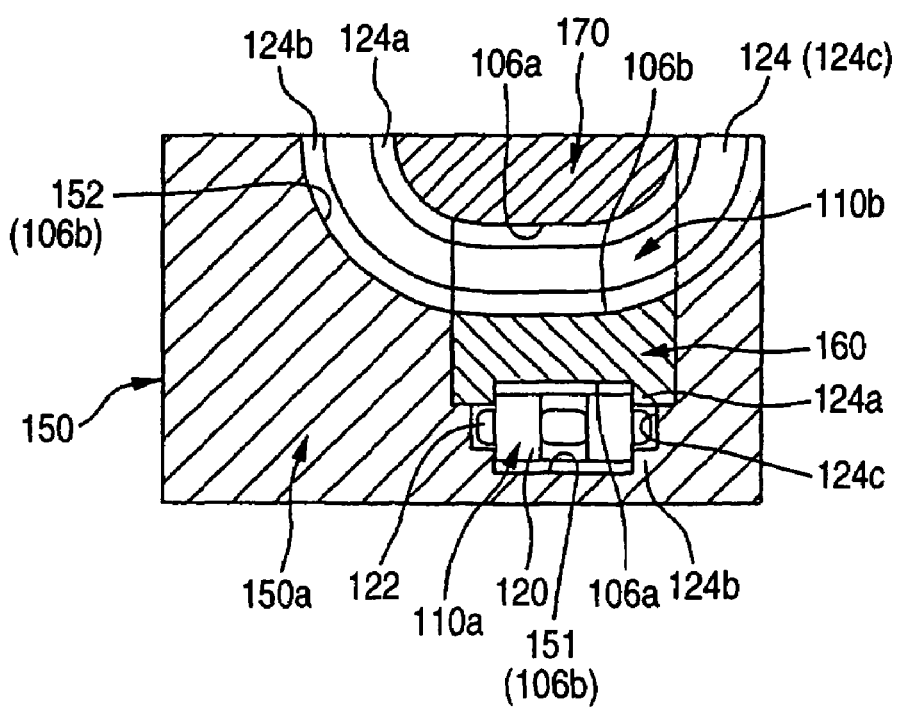
FIG. 39 is a section view showing a modification of the structure of fitting the end cap body and the first return guide.

FIG. 39 shows a modification of the structure of fitting the end cap body 150a and the first return guide 160. In the modification, the bottom face 124c of the guide groove 124 which is disposed in the direction change path 110a is disposed in the end cap body 150a. The split plane between the first return guide 160 and the end cap body 150a is on an extended plane 183 (see FIG. 37) in the roller axis direction of the inner periphery support wall 124a of the guide groove 124 which is formed in the first return guide 160. The positioning face and the engaging face of the first return guide 160 with respect to the end cap body 150a in the vertical direction in FIG. 39 are on the roller axis extended plane 183 of the inner periphery support wall 124a. The positioning face and the engaging face of the first return guide 160 in the lateral direction in FIG. 39 are the side face 181 (see FIG. 37) of the first return guide 160.

Figure 40:
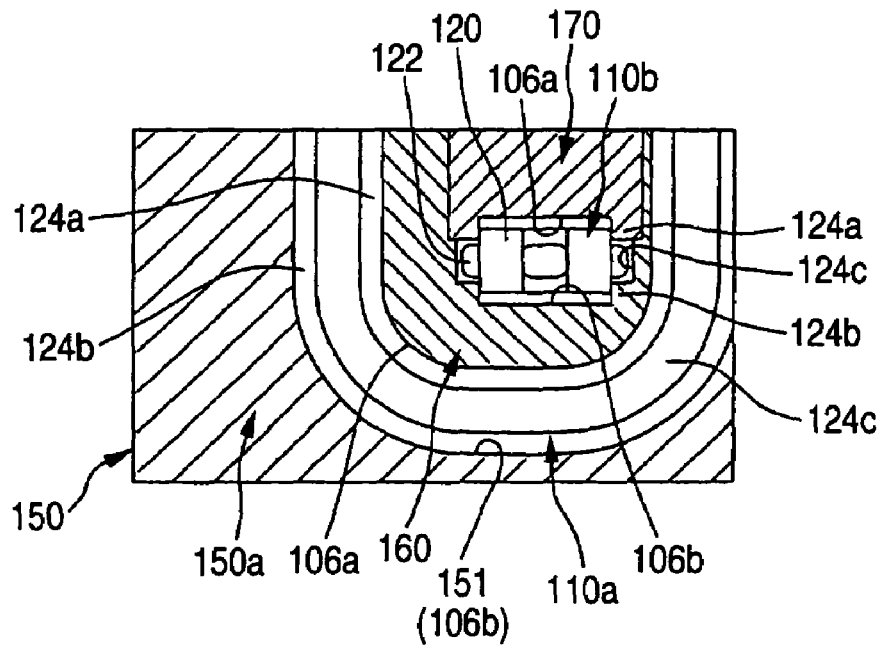
FIG. 40 is a section view showing a modification of the structure of fitting the first return guide and the second return guide.
Figure 41:
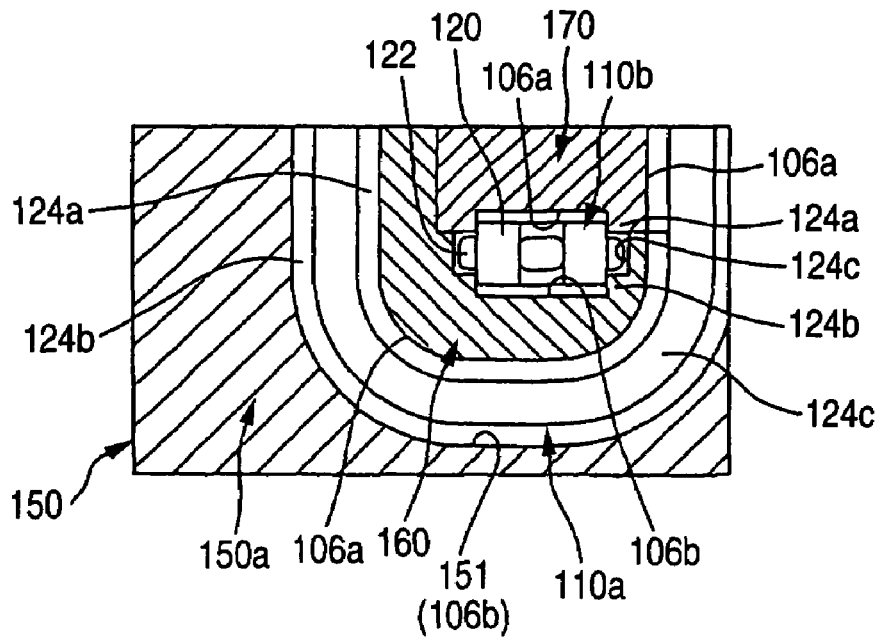
FIG. 41 is a section view showing a modification of the structure of fitting the first return guide and the second return guide.

FIG. 40 shows a modification of the structure of fitting the first return guide 160 and the second return guide 170. In the modification, the bottom face 124c of the guide groove 124 which is disposed in the direction change path 110b is disposed in the inner peripheral bottom portion of the first return guide 160 and the U-shaped recess 152 of the end cap body 150a. The split plane between the second return guide 170 and the first return guide 160 is on an extended plane 183 (see FIG. 37) in the roller axis direction of the inner periphery support wall 124a of the guide groove 124 which is formed in the second return guide 170. The positioning face and the engaging face of the second return guide 170 with respect to the first return guide 160 in the vertical direction in FIG. 40 are on the roller axis extended plane 183 of the inner periphery support wall 124a. The positioning face and the engaging face of the second return guide 170 in the lateral direction in FIG. 40 are the side face 181 (see FIG. 37) of the second return guide 170. FIG. 41 shows an example in which a part of the inner peripheral roller raceway groove 106a which forms the direction change path 110a is disposed in the second return guide 170.

Figure 42:
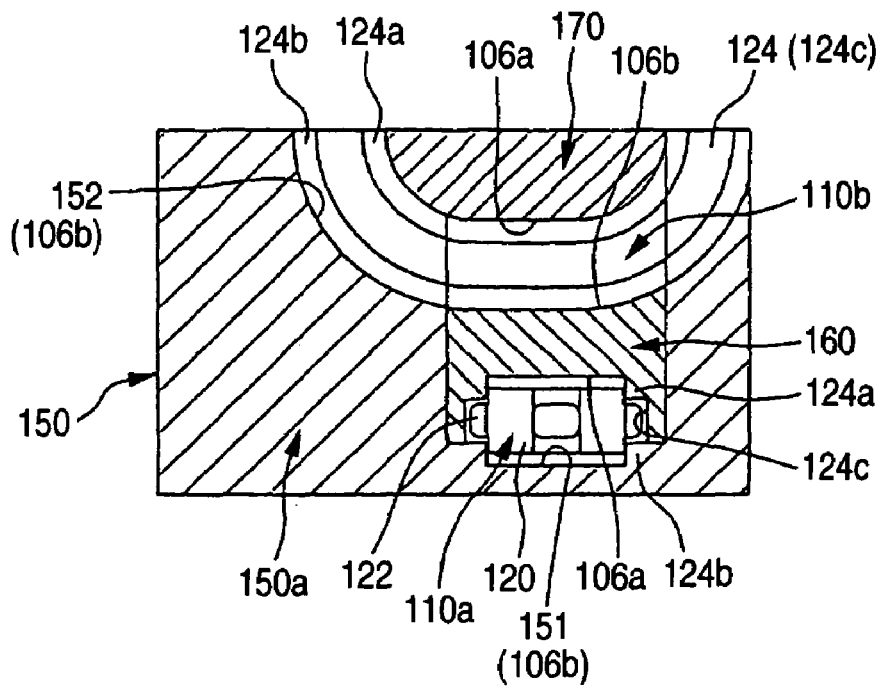
FIG. 42 is a section view showing a modification of the structure of fitting the end cap body and the first return guide.

FIG. 42 shows a modification of the structure of fitting the end cap body 150a and the first return guide 160. In the modification, the bottom face 124c of the guide groove 124 which is disposed in the direction change path 110a is disposed in the first return guide 160. The split plane between the first return guide 160 and the end cap body 150a is on an extended plane 184 (see FIG. 37) in the roller axis direction of the outer periphery support wall 124b of the guide groove 124 which is formed in the fitting recess 151 of the end cap body 150a. The positioning face and the engaging face of the first return guide 160 with respect to the end cap body 150a in the vertical direction in FIG. 42 are on the roller axis extended plane 184 of the outer periphery support wall 124b of the guide groove 124. The positioning face and the engaging face of the first return guide 160 in the lateral direction in FIG. 42 are the side face 181 (see FIG. 37) of the first return guide 160.

Figure 43:
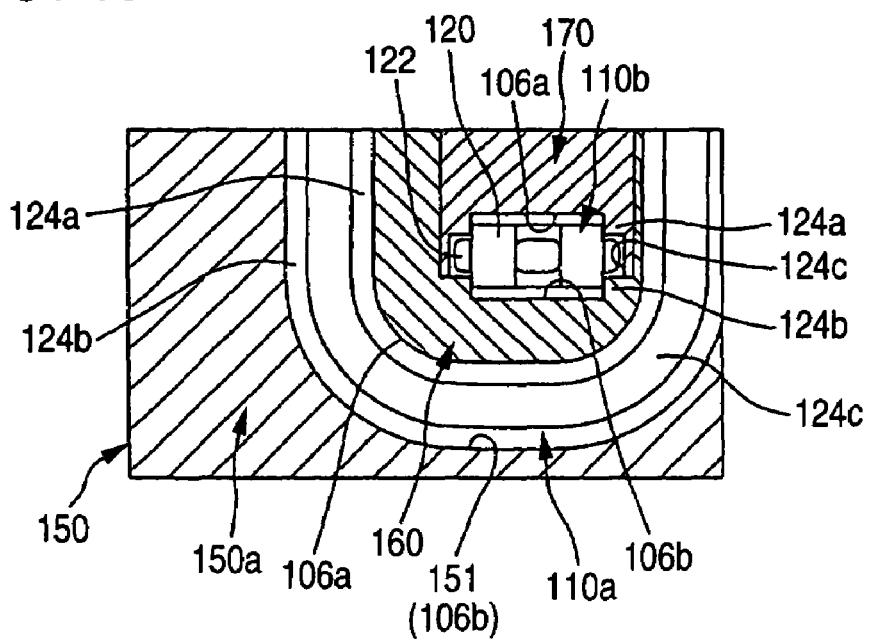
FIG. 43 is a section view showing a modification of the structure of fitting the first return guide and the second return guide.
Figure 44:
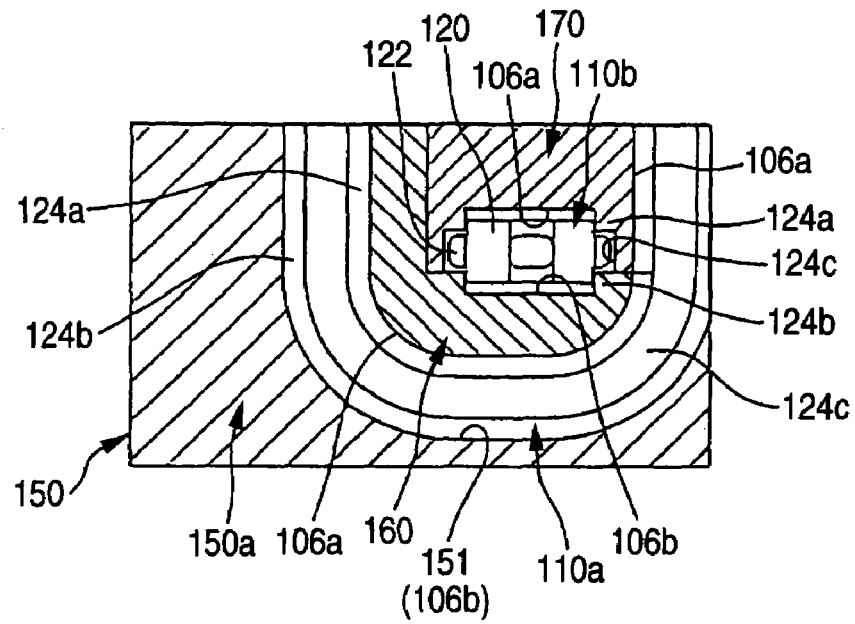
FIG. 44 is a section view showing a modification of the structure of fitting the first return guide and the second return guide.

FIG. 43 shows a modification of the structure of fitting the first return guide 160 and the second return guide 170. In the modification, the bottom face 124c of the guide groove 124 which is disposed in the direction change path 110b is disposed in the second return guide 170. The split plane between the first return guide 160 and the second return guide 170 is on an extended plane 184 (see FIG. 37) in the roller axis direction of the outer periphery support wall 124b of the guide groove 124 which is formed in the first return guide 160. The positioning face and the engaging face of the second return guide 170 with respect to the first return guide 160 in the vertical direction in FIG. 43 are on the roller axis extended plane 184 of the outer periphery support wall 124b. The positioning face and the engaging face of the second return guide 170 in the lateral direction in FIG. 43 are the side face 181 (see FIG. 37) of the second return guide 170. FIG. 44 shows an example in which a part of the inner peripheral roller raceway groove 106a which forms the direction change path 110a is disposed in the second return guide 170.

Figure 45:
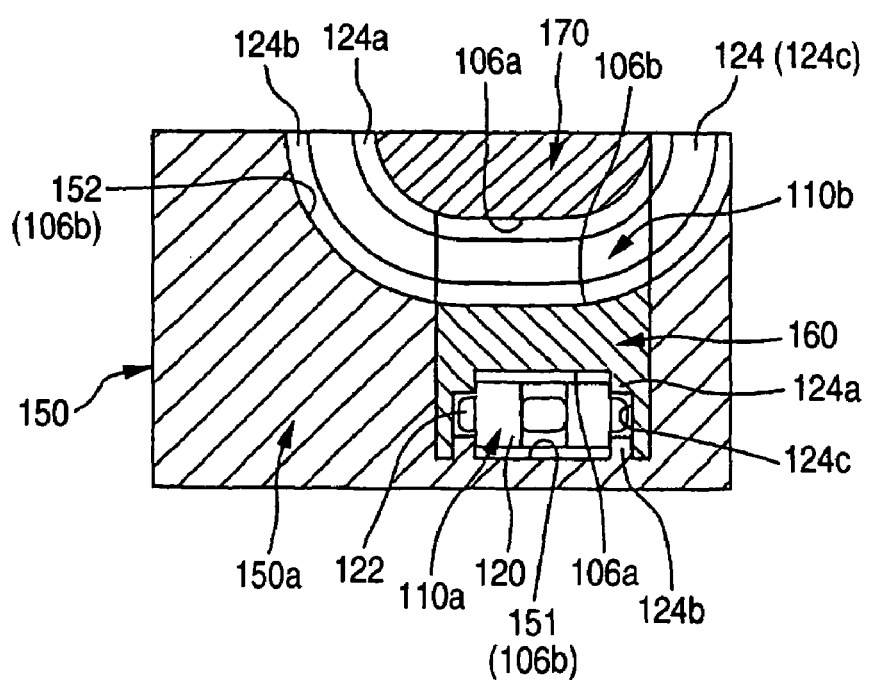
FIG. 45 is a section view showing a modification of the structure of fitting the end cap body and the first return guide.

FIG. 45 shows a modification of the structure of fitting the end cap body 150a and the first return guide 160. In the modification, the bottom face 124c of the guide groove 124 which is disposed in the direction change path 110a is disposed in the first return guide 160. The split plane between the first return guide 160 and the end cap body 150a is on an extended plane 185 (see FIG. 37) in the roller axis direction of the outer peripheral roller raceway groove 106b which is disposed in the fitting recess 151 of the end cap body 150a. The positioning face and the engaging face of the first return guide 160 with respect to the end cap body 150a in the vertical direction in FIG. 45 are on the roller axis extended plane 185 of the outer peripheral roller raceway groove 106b. The positioning face and the engaging face of the first return guide 160 in the lateral direction in FIG. 45 are the side face 181 (see FIG. 37) of the first return guide 160 or an outer side face 186 (see FIG. 37) of the outer periphery support wall 124b of the guide groove 124 which is disposed in the fitting recess 151 of the end cap body 150a.

Figure 46:
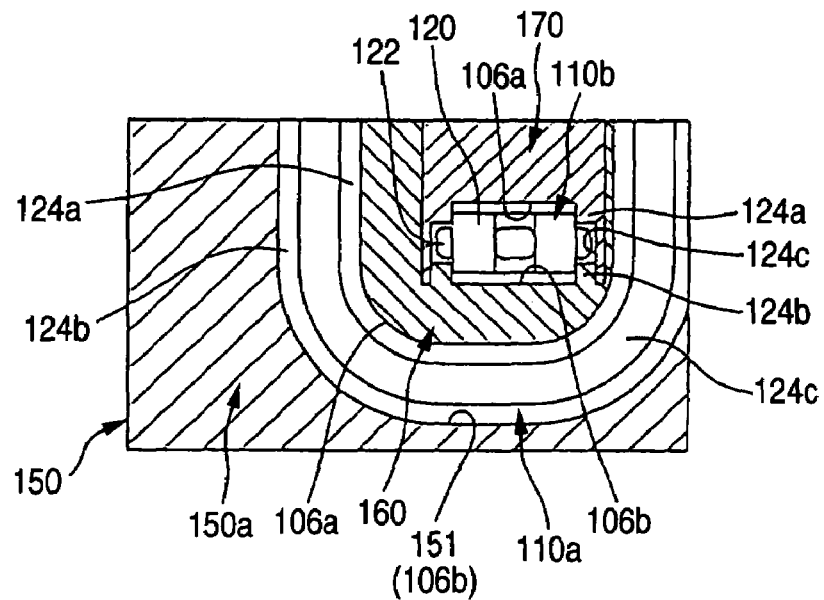
FIG. 46 is a section view showing a modification of the structure of fitting the first return guide and the second return guide.
Figure 47:
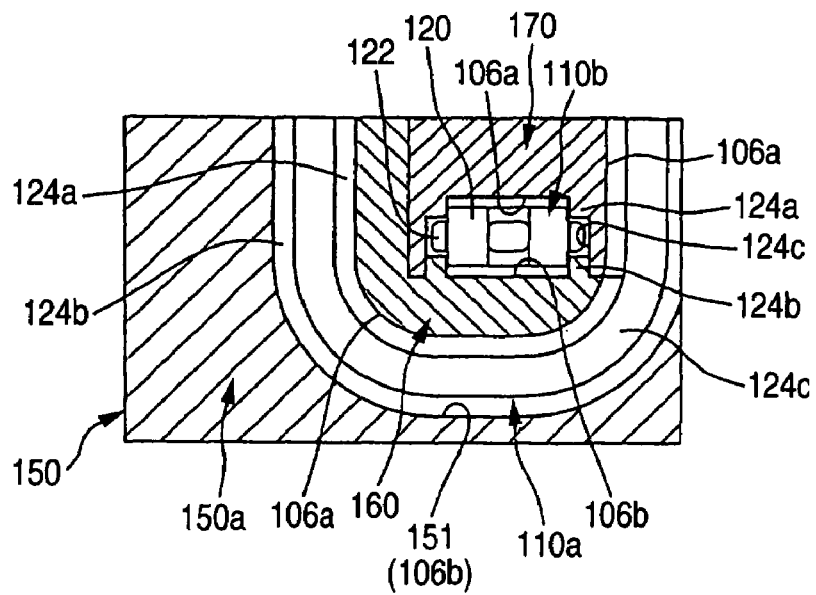
FIG. 47 is a section view showing a modification of the structure of fitting the first return guide and the second return guide.

FIG. 46 shows a modification of the structure of fitting the first return guide 160 and the second return guide 170. In the modification, the bottom face 124c of the guide groove 124 which is disposed in the direction change path 110b is disposed in the second return guide 170. The split plane between the second return guide 170 and the first return guide 160 is on an extended plane 185 (see FIG. 37) in the roller axis direction of the outer peripheral roller raceway groove 106b of the first return guide 160. The positioning face and the engaging face of the second return guide 170 with respect to the first return guide 160 in the vertical direction in FIG. 46 are on the roller axis extended plane 185 of the outer peripheral roller raceway groove 106b. The positioning face and the engaging face of the second return guide 170 in the lateral direction in FIG. 46 are the side face 181 (see FIG. 37) of the second return guide 170 or an outer side face 186 (see FIG. 37) of the outer periphery support wall 124b of the guide groove 124 which is disposed in the first return guide 160. FIG. 47 shows an example in which a part of the inner peripheral roller raceway groove 106a which forms the direction change path 110a is disposed in the second return guide 170.

As apparent from the above description, according to the invention of the first aspect or the second aspect, without causing the arm portion of the separator to interfere with the guide groove, the width of the guide groove in the linear motion region and that of the guide groove in the direction change region can be set to optimum values, and, in both the linear motion region and the direction change region, the sizes of the gaps between the arm portion of the separator and the guide grooves can be made optimum.

As a result, it is possible to attain an effect that, in the endless circulation raceway, when the separator and the cylindrical roller are moved with being pushed by the rear cylindrical roller, it is possible to suppress the separator from producing a zigzag motion, and hence the axis-to-axis distance of the adjacent cylindrical rollers is less changed, so that a satisfactory operation ability can be ensured.

In the invention of the third aspect, in addition to the effects of the invention of the first aspect or the second aspect, it is possible to attain a further effect that the width of the guide groove is made larger at the position which is on the side of the linear motion region with respect to the position where the linear motion region is connected to the direction change region, and hence the guide groove elongating from the linear motion region to the direction change region can be formed as a smooth arcuate raceway, whereby the operation ability can be further improved.

In the invention of the fourth aspect or the fifth aspect, in addition to the effects of the invention of any one of the first aspect to the third aspect, it is possible to attain a further effect that, even when the separator is not pushed by the rear cylindrical roller, the separator can be moved by a pulling operation, and hence the effect of suppressing the separator from producing a zigzag motion is enhanced.

What is claimed is:

1. A linear guide apparatus comprising:
  a guide rail including an axially elongating rolling element rolling groove in each of sides thereof, and extended in an axial direction;
  a slider including rolling element rolling grooves respectively opposed to the rolling element rolling grooves of the guide rail, and straddling the guide rail to be relatively movable in the axial direction via a number of cylindrical rollers, the rollers serving as rolling elements interposed between the opposed rolling element rolling grooves; and
  a plurality of separators each being independent of each other and having: a separator body interposed between adjacent the cylindrical rollers; and an arm portion integrally formed on the separator body and contacting at least one of axial end flat faces of the cylindrical rollers,
  wherein the slider includes a slider body having a rolling element path passing through the body in the axial direction; and a pair of end caps respectively having curved direction change paths through which a pair of the rolling element rolling grooves communicates with the rolling element path, the end caps being respectively fixed to axial end faces of the slider body; a guide groove guiding the arm portions of the separators in a circulation direction of the cylindrical rollers when the cylindrical rollers circulate through the pair of the rolling element rolling grooves, the direction change paths, and the rolling element path, wherein a width of the guide groove is larger than a width of each of the arm portions, the width of the guide groove in a region of each of the direction change paths is larger than the width of the guide groove in a region where the cylindrical rollers linearly move, and end portions of each of the arm portions are chamfered, the end portions being directed in the circulation direction of the cylindrical rollers, and wherein the direction change paths comprise an inner guide groove formed on an inner-diameter side of the direction change paths so that end portions thereof smoothly continue from the rolling element rolling groove.

2. A linear guide apparatus according to claim 1, wherein, at a position where the linear motion region is connected to one of the direction change regions, a shape of an inner wall face of an inner side of the guide groove in the direction change path is changed.

3. A linear guide apparatus according to claim 1, wherein the width of the guide groove is made larger at a position being on a side of the linear motion region with respect to a position where the linear motion region is connected to one of the direction change regions.

4. A linear guide apparatus according to claim 1, wherein the arm portions is formed a band-like shape along the circulation direction of the cylindrical rollers.

5. A linear guide apparatus according to claim 1, wherein the arm portion is couplable to the axial end faces of the cylindrical roller.

* * * * *